US010976406B1

(12) United States Patent
    Castagnoli

(10) Patent No.: US 10,976,406 B1
(45) Date of Patent: Apr. 13, 2021

(54) MULTI-LAYER STATISTICAL WIRELESS TERMINAL LOCATION DETERMINATION

(71) Applicant: Juniper Networks, Inc., Sunnyvale, CA (US)

(72) Inventor: Neal Dante Castagnoli, Las Vegas, NV (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/805,256

(22) Filed: Feb. 28, 2020

(51) Int. Cl.
    *G01S 5/02* (2010.01)
(52) U.S. Cl.
    CPC .................. *G01S 5/0252* (2013.01)
(58) Field of Classification Search
    CPC ............ G01S 5/0252; H04W 64/00
    See application file for complete search history.

(56) References Cited

U.S. PATENT DOCUMENTS

| 9,743,254 | B2 | 8/2017 | Friday et al. | |
|---|---|---|---|---|
| 10,481,247 | B2 | 11/2019 | Khan et al. | |
| 2014/0226503 | A1* | 8/2014 | Cooper | G01S 5/021 370/252 |
| 2016/0323754 | A1* | 11/2016 | Friday | H04W 16/28 |
| 2018/0234937 | A1* | 8/2018 | Yoon | G01S 11/06 |
| 2019/0239025 | A1 | 8/2019 | Keal | |
| 2020/0033463 | A1* | 1/2020 | Lee | G01S 5/0252 |

FOREIGN PATENT DOCUMENTS

GB  2563825  1/2019

OTHER PUBLICATIONS

"European Application Serial No. 20182282.2, Extended European Search Report dated Nov. 20, 2020", 8 pgs.

* cited by examiner

*Primary Examiner* — Ernest G Tacsik
(74) *Attorney, Agent, or Firm* — Schwegman Lundberg & Woessner, P.A.

(57) ABSTRACT

Disclosed are embodiments for determining a location of a wireless terminal. The wireless terminal measures signal strength of a plurality of wireless transmitters. Based on this information, a plurality of location probability surfaces are generated. Each location probability surface indicates a plurality of probabilities that the wireless terminal is in each of a corresponding plurality of geographic regions. These probability surfaces are then averaged to determine a composite location probability surface. A motion probability surface is also determined, which stores a plurality of probabilities indicating variations of motion of the wireless terminal. The composite location probability surface is then updated based on the motion probability surface. A location estimate of the wireless terminal is then determined based on the updated composite location probability surface.

20 Claims, 17 Drawing Sheets

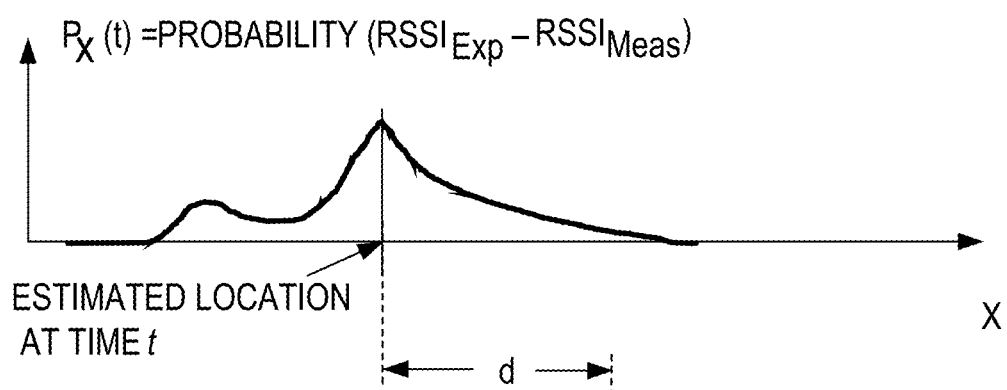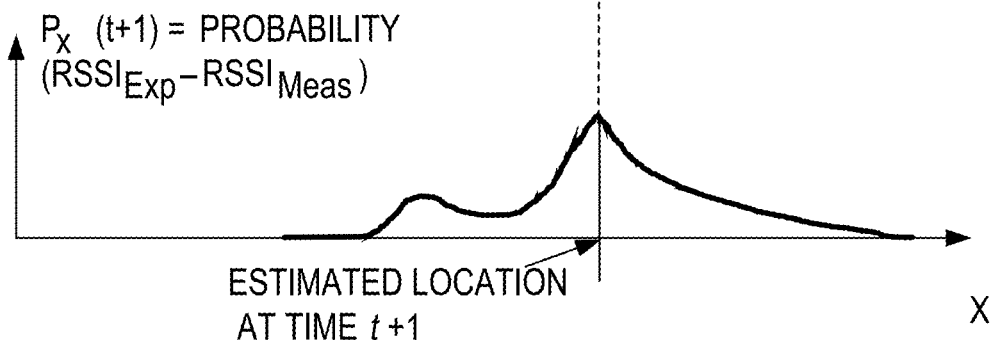
FIG. 7

MULTI-LAYER STATISTICAL WIRELESS TERMINAL LOCATION DETERMINATION

FIELD

The present application relates to wireless communications and, more particularly, to methods and/or apparatus for determining the location of objects associated with wireless networks.

BACKGROUND

Estimation of location of a wireless terminal is essential in many fields such as navigation and location of moving objects, identifying location of client experiencing performance degradation, etc.

The location of a wireless terminal can be estimated by two distinct methods. One method is based on strengths of signals received by the wireless terminal from multiple radio transmitters located in a well-known location. In accordance with this method the wireless terminal measures the signal strengths of each transmitter and reports the signal strengths to a location engine. The location engine infers the attenuation of the received signals along the path from the transmitter to the receiver. The attenuation of the transmitted signals is used to determine the distance from each transmitter to the receiver. The location engine then uses the known location of the transmitters to determine the location of the wireless terminal.

In accordance with a second method the wireless terminal transmits a signal which is received by multiple receivers located in well-known locations. Similarly, the receivers convey the respective signal strength information to the location engine which estimates the distance of the wireless terminal from the fixed receivers. The location engine then uses the well-known locations of the receivers to determine the location of the wireless terminal.

Measured signal strengths are prone to error due to noise and multi-path and as such may be inaccurate. For example, when estimating the location of a device based on three transmitters, the location information based on any two transmitters may conflict (be different) than the location inferred based on the information from the third transmitter.

What is needed is a method that compensates for the distorted signal strength measurements and provides consistent location estimation for the wireless terminal.

BRIEF DESCRIPTION OF THE FIGURES

FIG. 7 illustrates an example shift in a location probability curve resulting from projected motion of a wireless terminal.

DETAILED DESCRIPTION

Figure 1:
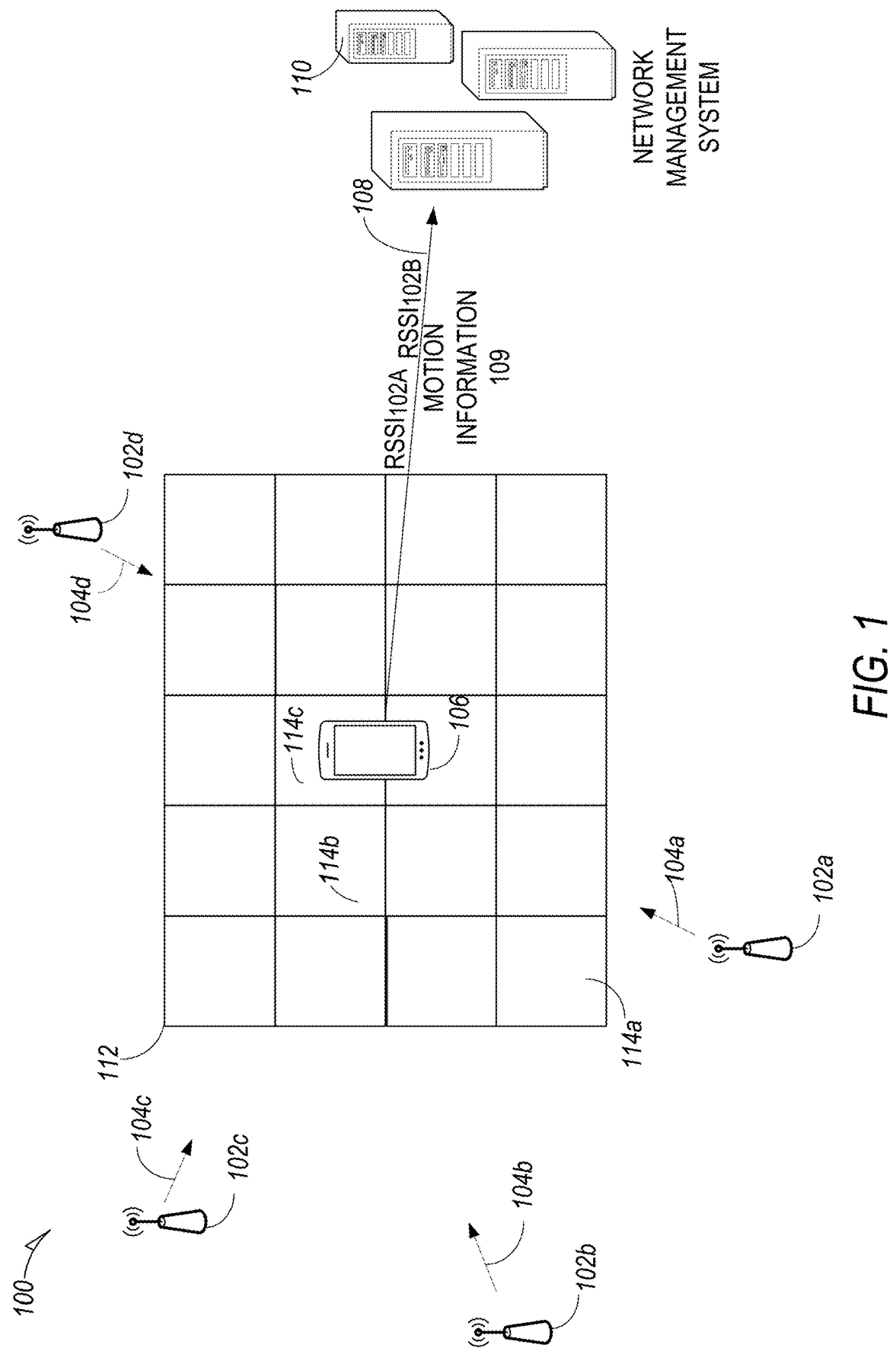
FIG. 1 is an overview diagram of a system that is implemented in one or more of the disclosed embodiments.

This disclosure is generally directed to determining an estimate of a location of a wireless terminal associated with a wireless network. Unlike transitional systems that determine a location of a wireless terminal using triangulation-based methods (e.g., averaging the areas defined by the intersections of the distances $Dist_i$), at least some of the disclosed embodiments rely on location probability surfaces (LPSs) to determine an estimated location.

An LPS represents a plurality of probabilities that a wireless terminal is located within a corresponding plurality of geographic regions. This plurality of geographic regions can be represented in a data structure, such as a two dimensional array, as a grid. In some embodiments, the grid in total may represent a two-dimensional geographic area of 50×50 meters and each cell in the grid or region is 0.5×0.5 meters for example. Other grid and cell/region sizes are within the scope of the disclosed embodiments. In some embodiments, each of the plurality of geographic regions is a two dimensional geographic area. In other embodiments, the plurality of geographic regions are each three-dimensional geographic volumes. Thus, in some embodiments, a location probability surface represents a probability that the WT is located in each of a plurality of different geographic volumes of for example, 50×50×50 meters, with each volume or region of the plurality of regions representing an area of, 0.5×0.5×0.5 meters in this example. Other region sizes are contemplated and within the scope of the disclosed embodiments.

To generate an LPS, the disclosed embodiments receive a signal strength measurement from a wireless terminal. This signal strength measurement is referred to as $SS_{Meas}$ in the discussion below. The signal strength measurement is of a signal generated and transmitted by a wireless transmitter and received by the wireless terminal. In some embodiments, a received signal strength indication (RSSI) represents the signal strength measurement.

From the signal strength measurement, the disclosed embodiments determine the plurality of probabilities that the wireless terminal is located within each of the corresponding plurality of geographic regions.

A general equation describing behavior of radio signals is as follows:

$$SS_i = PLE * \log(Dist_i) + Int + Dir_i \qquad \text{Eq.1}$$

where:
- $SS_i$ a signal strength of an $i^{th}$ wireless transmitter as experienced (and measured) by the wireless terminal,
- PLE a path loss exponent; (e.g. −20 db for line of sight loss; <−20 db for those environments with attenuation, such as the signal being transmitted through translucent objects),
- $Dist_i$ distance between the wireless terminal and an $i^{th}$ transmitter,
- Int an intercept function of the power of the transmitter,
- $Dir_i$ a directional adjustment reflecting a gain of antennas in a direction along a path between the $i^{th}$ transmitter and wireless terminal.

As part of a determination of probabilities in a location probability surface, the disclosed embodiments determine an expected signal strength of each of the plurality of regions. An expected signal strength for a region is based on one or more of a transmit power of the wireless transmitter, and a distance between the wireless transmitter and the respective region. Thus, these embodiments determine each of the respective expected signal strength measurements based on a respective distance between the respective region and the wireless transmitter as described in Equation 1 above. The distance between the respective region and wireless transmitter is determined, in some embodiments, based on known locations of both the respective region and the wireless transmitter. For example, some embodiments receive configuration information that defines locations of known wireless transmitters. Additionally, these embodiments receive configuration input defining locations of the plurality of regions. In some embodiments, locations of the plurality of regions is inferred based on locations of the known wireless transmitters (e.g. a geographic area between the known wireless transmitters is divided into the plurality of regions).

Signal strength measurements by a wireless terminal are affected by noise. Under some circumstances, the measured signal strengths contain approximately six (6) db of noise (SD=6 db). Thus, one difference between $SS_{Meas}$ and $SS_{Exp}$ is attributable to the noise. There are one or more additional factors, including multipath, a gain of the receiver, and other parameters associated with a model of the channel. Gaussian noise can contribute to the difference between $SS_{Exp}$ and $SS_{meas}$.

Some of the disclosed embodiments then determine a difference between the measured and expected signal strengths based Equation 2 below:

$$SS_{Error} = SS_{Exp} - SS_{Meas} \quad \text{Eq. 2}$$

where:
- $SS_{Error}$ difference between expected and measured signal strengths,
- $SS_{Exp}$ an expected signal strength value as calculated, is some embodiments, via Equation 1, and
- $SS_{Meas}$ a measured signal strength values (as measured by the wireless terminal).

As a noise level can be empirically measured to be ~six (6) db, a probability curve of $SS_{Error}$ is assumed to be Gaussian with Sigma=6 in some embodiments. Other curves may be used in other embodiments. For each dimension of the $SS_{Error}$ and for each cell the Probability(i, x, y) is determined where i is the index of the ith dimension corresponding to the $i^{th}$ measured signal strength received from the $i^{th}$ radio transmitter, and x & y are the consistent coordinates of a specific cell in the grid.

Thus, to generate a location probability surface, an expected signal strength of a signal in each of a plurality of regions is determined. In at least some embodiments, this determination is based on at least a location of a wireless transmitter generating the signal. corresponding differences between the expected signal strength of a region and the measured signal strength are also determined. Probabilities that the wireless terminal is located in each of the regions is then determined based on the corresponding differences.

Some of the disclosed embodiments determine multiple location probability surfaces, one surface for each wireless transmitter received and measured by the wireless terminal. To support this, the wireless terminal performs a plurality of signal strength measurements (one for each wireless transmitter). These signal strength measurements are transmitted, in some embodiments, by the wireless terminal to a network management system for further processing. The signal strength measurements are used to determine signal strength errors for each cell. The signal strength error is then used to determine a probability that the mobile device is located in each specific cell. These probability surfaces are referred to throughout this disclosure as $P_i(SS_{Exp} - SS_{Meas})$ where the index i represent an $i^{th}$ dimension of a signal strength measurement upon which the probability surface is derived.

Some wireless terminal embodiments determine signal strength measurements periodically, iteratively, continuously, or upon command from a user. These measurements are then transmitted to a network management system. For each dimension of the measured signal strength and for each cell in the grid, the system calculates the probability that the wireless terminal is in the specific cell based on the value of the specific dimension of the $SS_{Error}$ value.

To determine the probability that a wireless terminal is within a particular region or cell of the grid, some embodiments multiply corresponding probability values from multiple location probability surfaces. Corresponding values in this context are values representing probability values within an equivalent region or grid cell. One or more of the disclosed embodiments implement this approach via Equation 3 below:

$$P_{x,y} = P1_{,x,y} * P2_{,x,y} * \ldots * P_{n-1,x,y} * P_{n,x,y} \quad \text{Eq. 3}$$

where:
- $P_{x,y}$ Probability that the wireless terminal is in a cell associated with the x, y, coordinates,
- P1,x,y—Probability that the wireless terminal is in the x, y cell based on the first dimension of $SS_{Error}$,
- P2,x,y Probability that the wireless terminal is in the x, y cell based on the second dimension of $SS_{Error}$,
- $P_{n-1,x,y}$ Probability that the wireless terminal is in the x, y cell based on the $(n-1)^{th}$ dimension of $SS_{Error}$,
- $P_{n,x,y}$ Probability that the wireless terminal is in the x, y cell based on the $n^{th}$ dimension of $SS_{Error}$,
- *—Multiplication operator As the probabilities of each location probability surface are independent, peak or maximum probabilities within each location probability surface may vary. Consequently, a cell-wise multiplication of n surfaces yields a new probability surface which may have multiple peaks and valleys. This new probability surface is referred to in this disclosure as a composite location probability surface. Some embodiments determine an estimated location of the wireless terminal based on the composite location probability surface. For example, in some embodiments, a region corresponding to a highest probability in the composite location probability surface is used as an estimated location of the wireless terminal. In other embodiments, a weighted value for each region or cell of the composite location probability surface is used to estimate the location of the wireless terminal. For example, in some aspects, weighted values along a first dimension or a second dimension may be determined for each cell or region (e.g. regions higher associated probability may be more heavily weighted than regions with lower associated probability).

The explanation above treats each region or cell of a location probability surface and/or the composite location probability surface as a singular point for which an expected signal strength at the center of the region is evaluated. Other embodiments may perform this calculation in the continuous domain. In this case the probability of the wireless terminal being in a specific region (e.g. cell x,y) is calculated for each dimension of the ith received signal by $$P_{x,y,i} = \int_x \int_y P_{x,y} (SS_{Exp} - SS_{Meas}) dx dy \qquad \text{Eq. 4}$$

In some embodiments, the location probability surface(s) and/or composite location probability surface are calculated periodically, (e.g., once per second) based on updated signal strength measurements performed by the wireless terminal and reported to a network management server.

Some of the disclosed embodiments generate a predicted location probability surface for a future time, e.g. T+1, based on information available at a previous time, e.g. time T. The predicted location probability surface for time T+1 is then utilized to generate a blended location probability surface for time T+1. The blended location probability surface at time T+1 is also generated based on a composite location probability surface for time T+1.

The predicted location probability surface is generated based on motion estimates for the wireless terminal. The motion estimates are based, in part, based on accelerometer and/or gyro information received from the wireless terminal itself. The motion estimates are also based, at least in some embodiments, on previous blended location probability surfaces of the wireless terminal. Thus, for example, a motion estimate at time T+2 is based, in some embodiments, on one or more of a blended location probability surface at times T=0 and/or T=1.

Each of the motion estimates of the wireless terminal is associated with a probability that the respective motion estimate is accurate for the wireless terminal. A combination of the motion estimates and their associated probabilities can be organized, in some embodiments, into a motion probability surface. Each cell of the surface represents a set of motion parameters for the wireless terminal, and a probability that those parameters accurately represent the motion of the wireless terminal.

In some embodiments, motion estimates are generated based on motion information received from the wireless terminal. Information received from the wireless terminal can include accelerations in each of an x, y, and z dimension. An accuracy associated with each of the acceleration measurements is also obtained from the wireless terminal in some embodiments. In other embodiments, the accuracy information is configured or hard coded at a network management system performing these calculations. The acceleration measurements provided by the wireless terminal are applied to a distribution (e.g. Gaussian) in order to generate a plurality of different motion estimates (and their associated probabilities), any one of which can reflect the true motion of the wireless terminal at an applicable time. For example, a motion estimation and its associated probability takes the form, in at least some embodiments, of [Vx, Vy, Vz, Prob] where Vx is speed in an X direction, Vy is speed in a Y direction, Vz is speed in a Z direction, and Prob is a probability that the wireless terminal exhibits the motion described by [Vx, Vy, Vz]. In some embodiments, only two dimensions of motion are estimated. In these embodiments, the motion estimate and its associated probability takes the form, in at least some embodiments, of [Vx, Vy, Prob].

Figure 13:
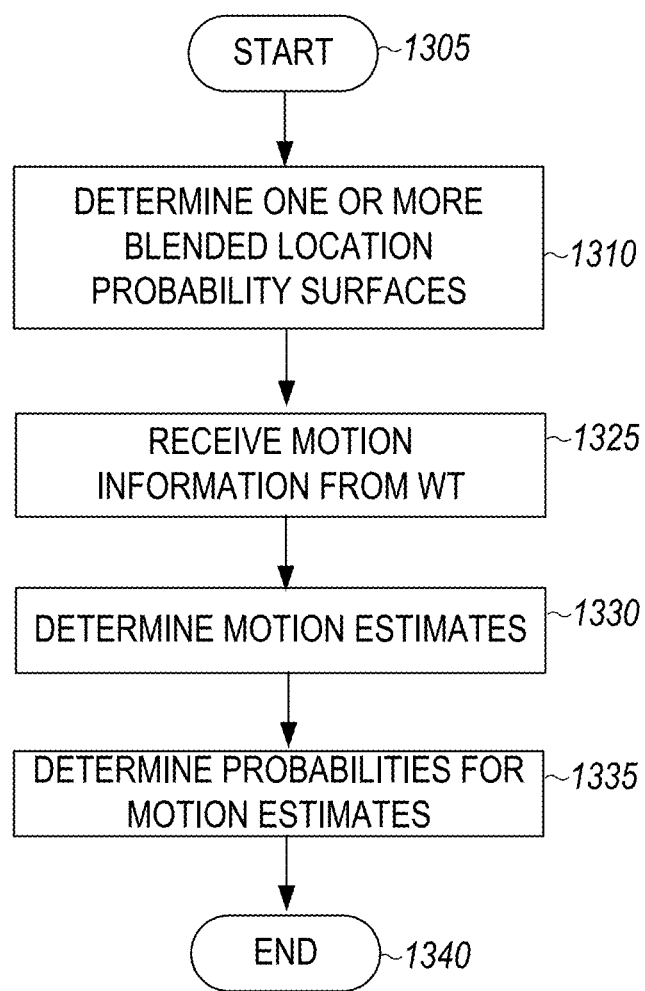
FIG. 13 is a flowchart of a process for determining a motion probability surface.

An example equation demonstrating generation of a motion probability surface is provided by Equation 5 below. Equation 5 is used in at least some of the disclosed embodiments:

$$P_m(t) = (P_{blended}(t-3) \oplus_{ab} P_{blended}(t-2) \oplus_{ab} P_{blended}(t-1)) \oplus_{acc} WT_{acc} \qquad \text{Eq (5)}$$

where:
$P_m(t)$ motion probability surface at time t,
$P_{blended}(t)$ blended location probability surface at time t,
$WT_{acc}$ velocity or acceleration information from wireless terminal (e.g. Vx, Vy, Vz, or $A_x$, $A_y$, $A_z$),
$\oplus_{ab}$ an aggregating blended location probability surface operator. In some embodiments, the aggregating blended location probability surface operator averages probabilities in corresponding regions or cells of two blended location probability surfaces,
$\oplus_{acc}$ an operator that applies motion information from the wireless terminal ($WT_{acc}$) to an aggregated blended location probability surface (produced via $\oplus_{ab}$. FIG. 13 below describes one embodiment of $\oplus_{acc}$.

Note that in some embodiments, multiple prior blended location probability surfaces are used when generating a motion probability surface. For example, additional surfaces $P_{blended}(t-2)$, $P_{blended}(t-3)$, and/or $P_{blended}\text{-}x(t-4)$ may be utilized to generate $P_m(t+1)$.

Figure 3:
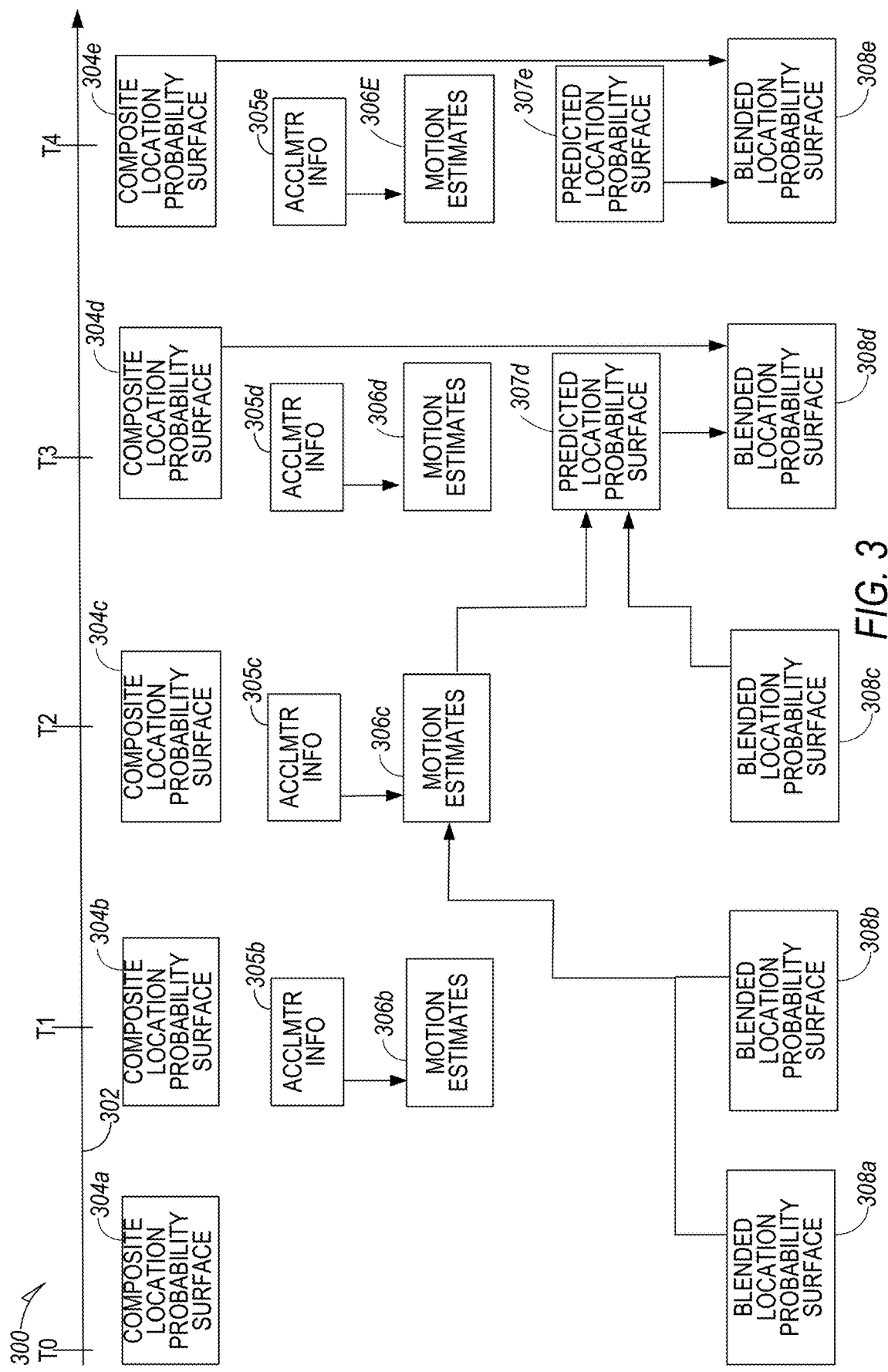
FIG. 3 is a diagram of data flow that is implemented in one or more of the disclosed embodiments.
Figure 14:
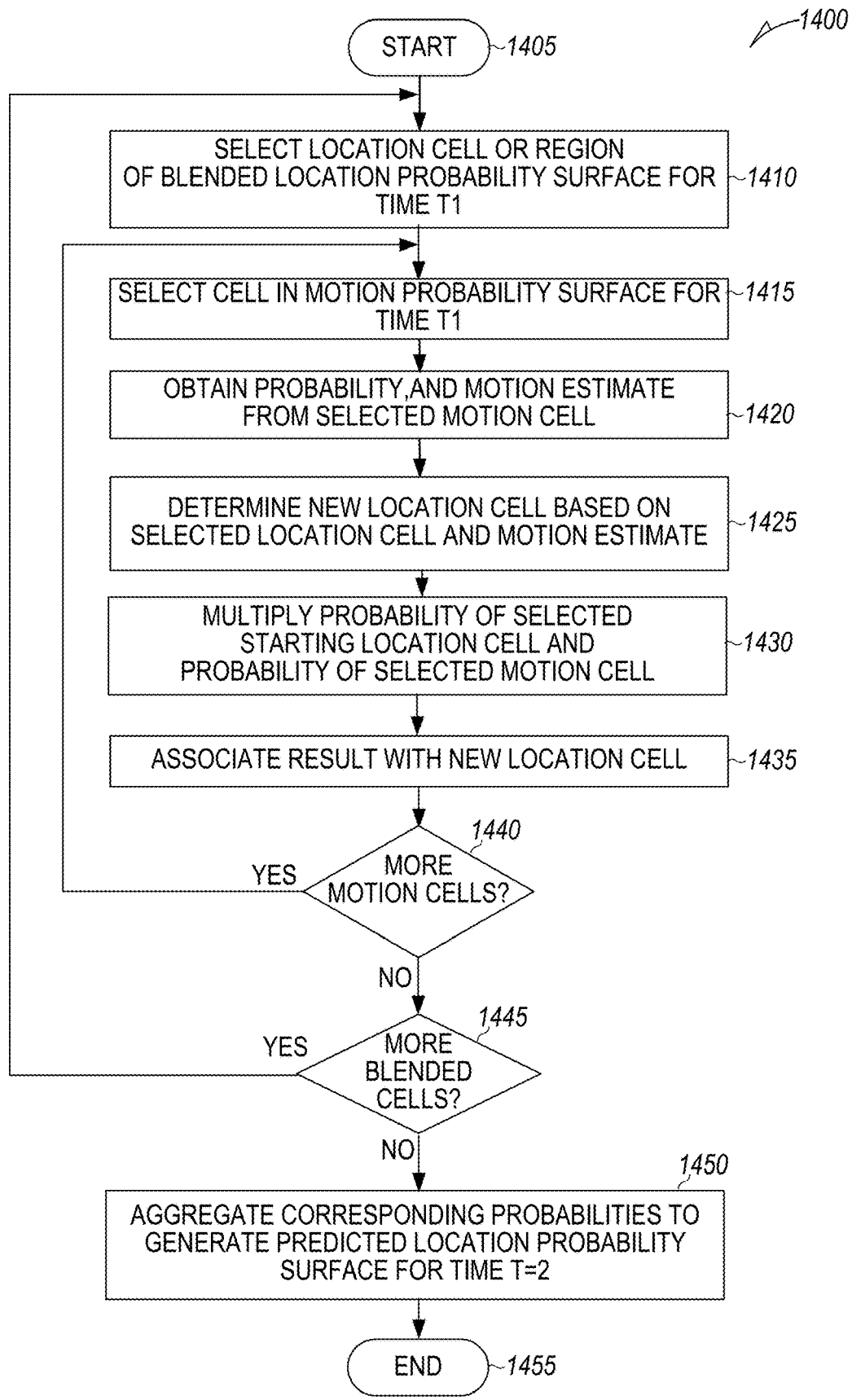
FIG. 14 is a flowchart of a process for applying a motion probability surface to a composite location probability surface.

Some estimates apply the plurality of motion estimates (e.g. a motion probability surface) to one or more prior blended location probability surfaces to generate a predicted location probability surface. An example for generating a predicted location probability surface is given by Equation 6 below:

$$P_{predicted}(t+1) = P_{blended}(t) \oplus_m P_m(t) \qquad \text{Eq. 6}$$

where:
$P_{predicted}(t+1)$ predicted location probability surface of wireless terminal at time t+1,
$P_{blended}(t)$ blended location probability surface at time t,
$\oplus_m$ motion operator. FIG. 14 below describes one embodiment of $\oplus_m$, and
$P_m(t)$ motion probability surface at time t Operation of Equation 6 is illustrated in FIG. 3 discussed below. In some embodiments, a blended location probability surface at time t is based on the predicted location probability surface at time t and a composite location probability surface at time t. This is shown via Equation 7 below:

$$P_{blended}(t) = P_{predicted}(t) \oplus_b P_{composite}(t) \qquad \text{Eq (7)}$$

where:
$P_{blended}(t)$ is a blended location probability surface at time t,
$P_{predicted}(t)$ is a predicted location probability surface at time t, and
$P_{composite}(t)$ is a composite location probability surface at time t, and
$\oplus_b$ is a blended operator for combining the predicted and composite location probability surfaces. In one example embodiment, $\oplus_b$ averages corresponding probabilities in a predicted location probability surface and a composite location probability surface.

In some embodiments, the blended location probability surface at time t is generated via a weighted sum of a predicted location probability surface and a composite location probability surface at time t. This is illustrated by Equation 8 below:

$$P_{blended}(t) = \alpha * P_{composite}(t) + \beta * P_{predicted}(t) \qquad \text{Eq. 8}$$

where:

$P_{blended}(t)$ blended location probability at time t, $P_{composite}(t)$ composite location probability surface at time t, $P_{predicted}(t)$ predicted location probability surface for time t, α and β parameters e.g., α+β=1. In some embodiments, each of α and β have a value of 0.5.

Some embodiments use a blended location probability surface at time t+1 and a motion probability surface at time t+1 to estimate a predicated location probability surface of the device at time t+2. Some of the disclosed embodiments iteratively calculate new composite location probability surfaces, motion estimates, predicted location probability surfaces, and blended location probability surfaces, and iteratively estimate locations of a mobile terminal based on these iteratively determined data structures.

In some embodiments, a location of the device is determined to be in a region having the largest probability. One embodiment of such an approach is represented by Equation 9 below:

$$\{x,y\}(t) = \text{Max}(P_{Blended}(t)) \qquad \text{Eq. 9}$$

where:

{x, y}(t) estimated location of the device at time t, $P_{blended}(t)$—blended location probability surface at time t, and $\text{Max}(P_{Blended}(t))$ Max function returns identification (e.g. x, y coordinates) of largest probability in $P_{Blended}(t)$.

Some embodiments rank regions according to their associated probabilities. A highest ranked set of these regions (e.g. k regions) are then selected. The location is then based on the k highest ranked regions (and not on regions ranked below the $k^{th}$ highest ranked region). One embodiment of this approach is represented mathematically by Equation 10 below:

$$x, y(\text{location}) = \sum_{i=1}^{K} (x_i, y_i) * P(x_i, y_i) \bigg/ \sum_{i=1}^{K} (P(x_i, y_i)) \qquad \text{Eq. 10}$$

where:

x,y (location)—estimated location based on a blended location probability surface, k a limit on a number of probability maximums considered when determining the estimated location, $(x_i, y_i)$ x, y coordinate of the $i^{th}$ ranked peak, and $P(x_i, y_i)$ a probability of the wireless terminal being at location $x_i, y_i$.

FIG. 1 is an overview diagram of a system 100 that is implemented in one or more of the disclosed embodiments. The system 100 includes four access points 102a-d. Each of the four access points 102a-d generates corresponding signals 104a-d. Signal 104a, signal 104b, signal 104c, and signal 104d are received by a wireless terminal 106. The wireless terminal 106 measures a strength of each of the signals 104a-d and generates a message 108 indicating the signal strengths. For example, FIG. 1 shows the message 108 indicating a received signal strength indication (RSSI) for a signal from access point 102a and a second RSSI value for a signal from access point 102b. RSSI is just one example of a signal strength measurement and other embodiments use different measurements for signal strength.

The wireless terminal 106 transmits the message 108 to a network management system 110. The network management system 110 utilizes the signal strength measurements included in the message 108 to estimate a position or geographic location of the wireless terminal 106. In some embodiments, the network management system 110 divides a geographic area 112 into a plurality of regions. Region 114a, region 114b, and region 114c are illustrated in FIG. 1, while other regions within the geographic area 112 are not labeled to preserve figure clarity. In some of the disclosed embodiments, the network management system 110 calculates a probability that the wireless terminal 106 is located in each of the plurality of regions (including the regions 114a-c). These probabilities are based on the signals 104a-d received by the wireless terminal 106. In particular, the probabilities are based on strengths of the signals 104a-d as measured by the wireless terminal. In some embodiments, the access points 102a-d are at known locations. Thus, a distance between each access point 102a-d and each region (e.g. 114a-c) can be determined by the network management system. From these distances, the network management system 110 determines an expected signal strength of a signal received from each of the access points 102a-d at each of the regions (e.g. 114a-c). By comparing the expected received signal strength to the signal strength measured by the wireless terminal, the network management system can determine a probability that the wireless terminal is in the region.

In some embodiments, these probabilities are refined via additional probabilities of the wireless terminal's location that are based on motion information for the wireless terminal. For example, in some embodiments, the wireless terminal provides motion information 109 to the network management system in the message 108. In other embodiments, a different message is used to provide motion information 109 from the wireless terminal 106 to the network management system 110. The wireless terminal 106 derives the motion information from, in some embodiments, an accelerometer that is integrated into the wireless terminal 106.

In some embodiments, motion of the wireless terminal 106 is inferred by the network management system 110 via changes in sequential determinations of the wireless terminals location, as explained further below.

Figure 2:
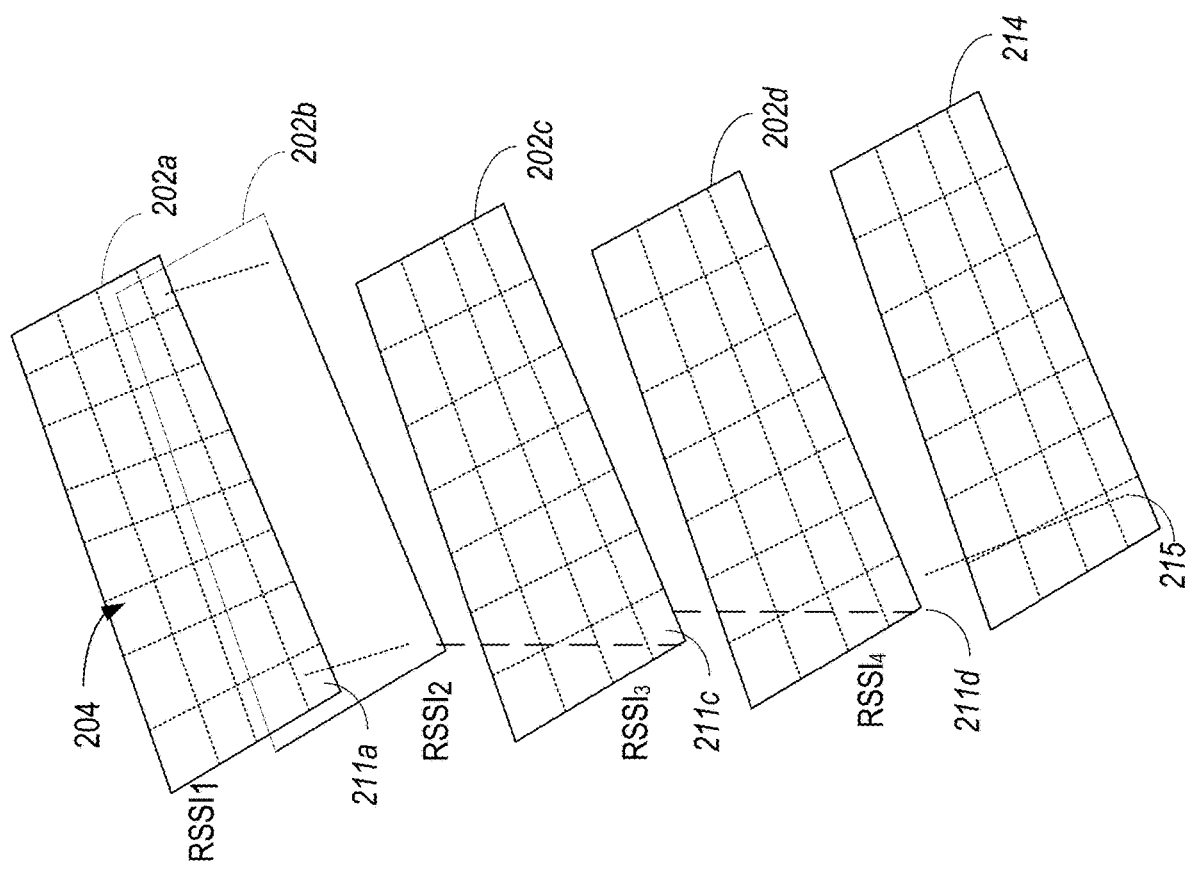
FIG. 2 shows aggregation of a plurality of location probability surfaces.

FIG. 2 shows aggregation of a plurality of location probability surfaces. As discussed above with respect to FIG. 1, the network management system 110 determines a plurality of probabilities that the wireless terminal 106 is within a corresponding plurality of regions (e.g. regions 114a-c). FIG. 2 shows a plurality of location probability surfaces 202a-d Each of the location probability surfaces 202a-d is generated based on signals from different wireless transmitters. For example, in one embodiment, each of the location probably surfaces 202a-d is generated based on signals from access points 102a-d respectively. Each of the location probability surfaces 202a-d includes a plurality of probabilities. This plurality of probabilities is illustrated in FIG. 2 via the grid like structure of the location probability surface 202a, labeled as grid 204. The probabilities included in each of the location probability surfaces 202a-d are not graphically illustrated, so the location probability surfaces appear flat for simplicity of illustration.

Each cell of the grid 204 represents a different probability included in the location probability surface. Each probability corresponds to a region, such as the regions 114a-c discussed above with respect to FIG. 1. In other words, each probability indicates a likelihood that the wireless terminal 106 is located within a region corresponding to the cell containing the probability. In at least some of the disclosed embodiments, a plurality of location probability surfaces (e.g. 202a-d) are generated. Each location probability surface is generated based on one or more single signal strength measurements by the wireless terminal 106 of a signal (e.g. any of 104a-d) from a single wireless transmitter (e.g. any one of AP 102a, AP 102b, AP 102c, or AP 102d). Thus, each of location probability surfaces 202a and 202b and 202c of FIG. 2 are generated based on signal strength measurements of different signals generated by different wireless transmitters.

FIG. 2 shows that the plurality of location probability surfaces 202a-d are aggregated to generate a composite location probability surface 214. Each cell of the composite location probability surface 214 (e.g. cell 215) has corresponding cells in each of the location probability surfaces (e.g. cell 211d for location probability surface 202d, cell 211c for location probability surface 202c, and cell 211a for location probability surface 202a). For figure clarity, a corresponding cell is not labeled for location probability surface 202b. These cells correspond because they each represent equivalent regions or locations. Aggregating corresponding probabilities in multiple location probability surfaces includes multiplying the probabilities in at least some embodiments. Thus, aggregating two or more location probability surfaces, for example, includes aggregating, for each of the plurality of regions represented by the two location probability surfaces, first and second probabilities corresponding to respective regions represented by the two or more location probability surfaces. A location estimate of the wireless terminal is then based, in at least some embodiments, on the aggregated first and second probabilities. The location estimate is based on more than just first and second probabilities in some embodiments, for example, those embodiments aggregating more than two location probability surfaces.

FIG. 3 is a diagram of data flow in a processing pipeline that is implemented in one or more of the disclosed embodiments. The processing pipeline is shown operating on several types of data at each of five time references T0-T5, shown on a time axis 302. An elapsed time between each of the time references T0-T5 is equivalent. An amount of elapsed time between each of the time references can vary by embodiment. Some embodiments generate a new set of data (e.g. composite location probability surface, motion probability surface, predicted location probability surface, and blended location probability surface) every one second, five seconds, ten seconds, 30 seconds, one minute or any elapsed time period. Various embodiments obtain new accelerometer measurements from the wireless terminal (discussed further below) at a different interval or an equivalent interval.

While each type of data shown is generated at each time reference T0-T4 in some embodiments, some data is omitted from the figure for clarity. FIG. 3 shows data flow 300 including composite location probability surfaces 304a-e, accelerometer information 305b-e, motion probability surfaces 306b-e, predicted location probability surfaces 307d-e, and blended location probability surfaces 308a-e.

In some embodiments, any of the composite location probability surfaces 304a-e are analogous to the composite location probability surface 214 discussed above with respect to FIG. 2. FIG. 3 also shows motion probability surfaces 306b-e. (Another motion probability surface which would be labeled 306a is omitted from the figure for clarity). Each of the accelerometer information 305b-e results from motion information provided by a wireless terminal, a location of which is being estimated by the data flow 300 shown in FIG. 3. At each time period T0-T4, FIG. 3 shows that the wireless terminal has provided corresponding motion information, e.g., acceleration information, represented by each of accelerometer information 305b-e.

Each of the motion probability surfaces 306b-e is generated based on motion information received from the mobile device, represented as the accelerometer information 305b-e. For example, the accelerometer information 305b-e indicates, in at least some embodiments, velocities in each of an X, Y, and Z directions. In accordance with other embodiments the accelerometer information 305b-e represents acceleration in the X, Y, and Z directions. The motion probability surfaces 306b-e are also generated, in at least some embodiments, based on one or more blended location probability surfaces from prior time periods. For example, FIG. 3 shows that motion probability surface 306c is generated based on at least the blended location probability surface 308a and 308b (see for example, Equation 5 above). The motion probability surface 306d is generated based on one or more of blended location probability surfaces 308a, 308b, and 308c. Lines indicated a dependency of motion probability surface 306d on any of the blended location probability surface 308a, 308b, or 308c are omitted from FIG. 3 to preserve clarity of the figure.

Each of the motion probability surfaces 306b-d are then used, in at least some embodiments, to generate a respective predicted location probability surface, such as the predicted location probability surface 307d shown in FIG. 3 (generated via motion probability surface 306c as shown) (see also Equation 6 above). The predicted location probability surface 307d is then used, along with the composite location probability surface 304d (which is based on signal strength measurements corresponding to time T3), to generate the blended location probability surface 308d (See also Equation 7 discussed above). While arrows illustrate a particular data flow used to generate blended location probability surface 308d in at least some embodiments, the reader should recognize that similar data flows would be employed to generate each of the blended location probability surface 308a-e. However, arrows illustrating all of these data flows are omitted for clarity.

Thus, FIG. 3 describes how some embodiments progressively or iteratively generate a first composite location probability surface 304a, second composite location probability surface 304b, third composite location probability surface 304c, and then a fourth composite location probability surface 304d. Each of these composite location probability surfaces is associated with a particular time reference, represented as times T0-T4 in FIG. 3. A plurality of motion probability estimates of the wireless terminal are also generated at each time reference. In FIG. 3, this information is represented as motion probability surfaces 306b-e. In some embodiments, the motion estimates are represented as a motion probability surface. In other embodiments, the motion estimates are represented via structures other than a motion probability surface. A blended location probability surface is then used, along with the motion probability surface to generate a predicted location probability surface for a subsequent time period When the subsequent time period arrives, the predicted location probability surface for the subsequent time period, and a composite location probability surface for that time period are then used to generate a blended location probability surface for that time period.

Note that FIG. 3 and the discussion above describe operation of the data flow 300 when it has reached a fully initialized or steady state mode of operation. One of skill would understand that when any one or more of the disclosed embodiments is first initialized, a data pipeline for multiple time periods, such as T0-T4 is not necessarily available. Therefore, some of the operations discussed above are not performed if the data is not available. For example, a first blended location probability surface generated by the disclosed embodiments is not based on prior blended location probability surfaces, since that data is not available. Similarly, when a first blended location probability surface is generated, a predicted location probability surface is not available, as predicted location probability surfaces are generally created for a future time reference. Thus, when a very first blended location probability surface is generated, it may simply be a copy of the corresponding composite location probability surface (e.g. blended location probability surface 308a generated based on composite location probability surface 304a, without use of a predicted location probability surface, at least in some embodiments.

Figure 4:
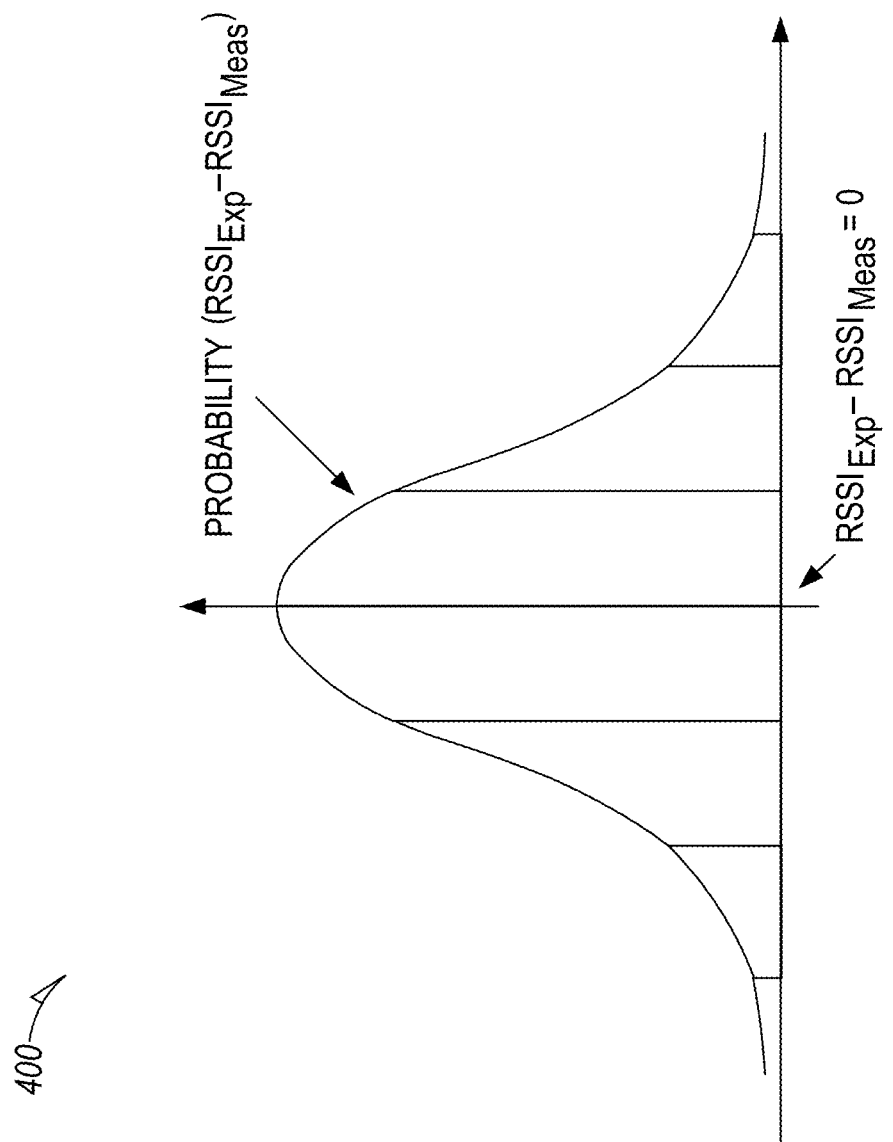
FIG. 4 is an example probability curve of a single dimension of a signal strength error.

FIG. 4 is a graph 400 of an example probability curve of a single dimension of an example $P(SS_{Error})$. A Gaussian probability curve is illustrated but other embodiments may provide for alternative probability distributions.

Figure 5:
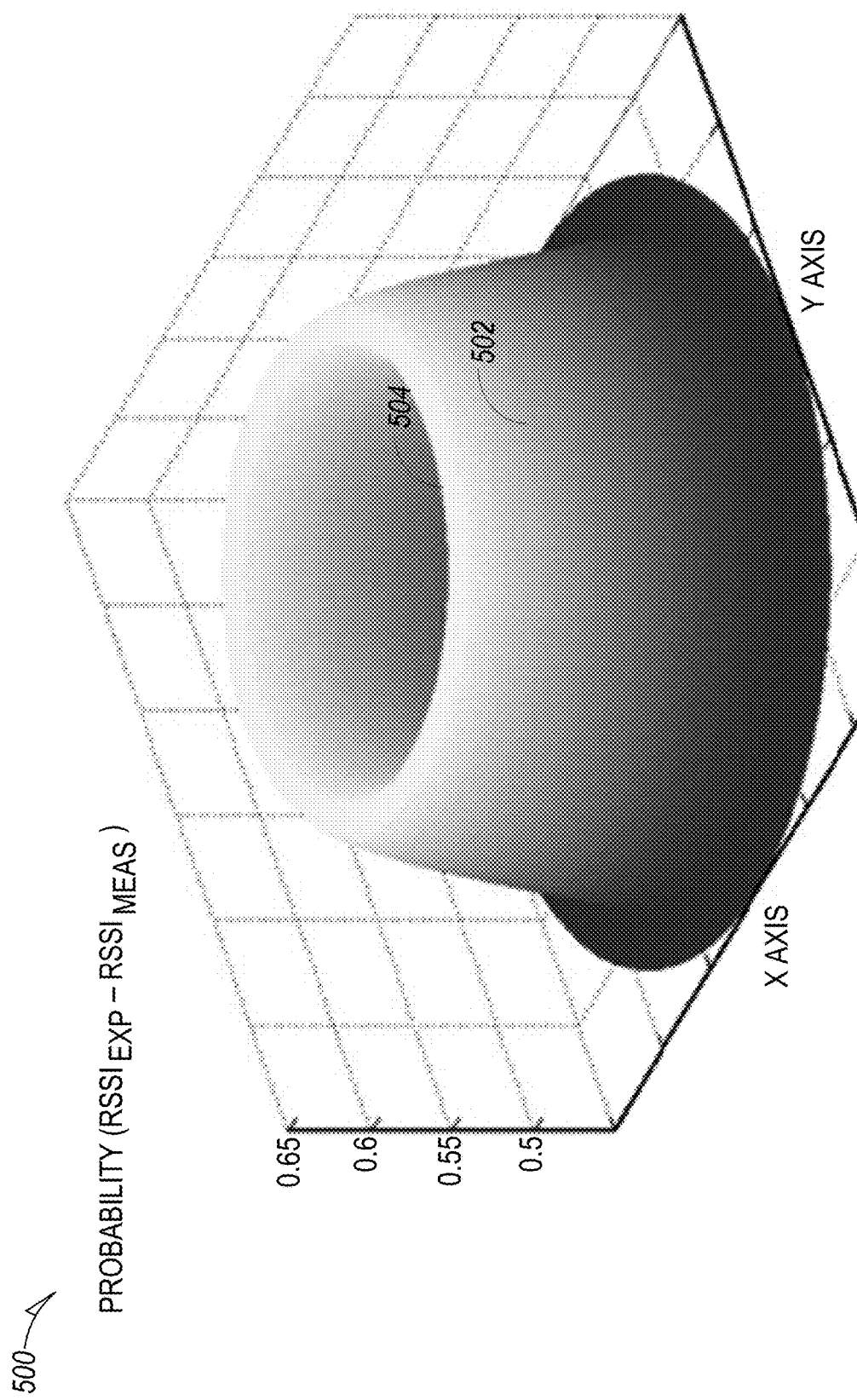
FIG. 5 is a graphical representation of probabilities of an example two-dimensional location probability surface.

FIG. 5 is a graphical representation 500 of probabilities of an example two-dimensional location probability surface. The probabilities 502 exhibit a donut shape. The donut shape illustrates a ring 504 of relatively high probability locations for a subject device, with surrounding regions exhibiting lower probabilities.

Figure 6:
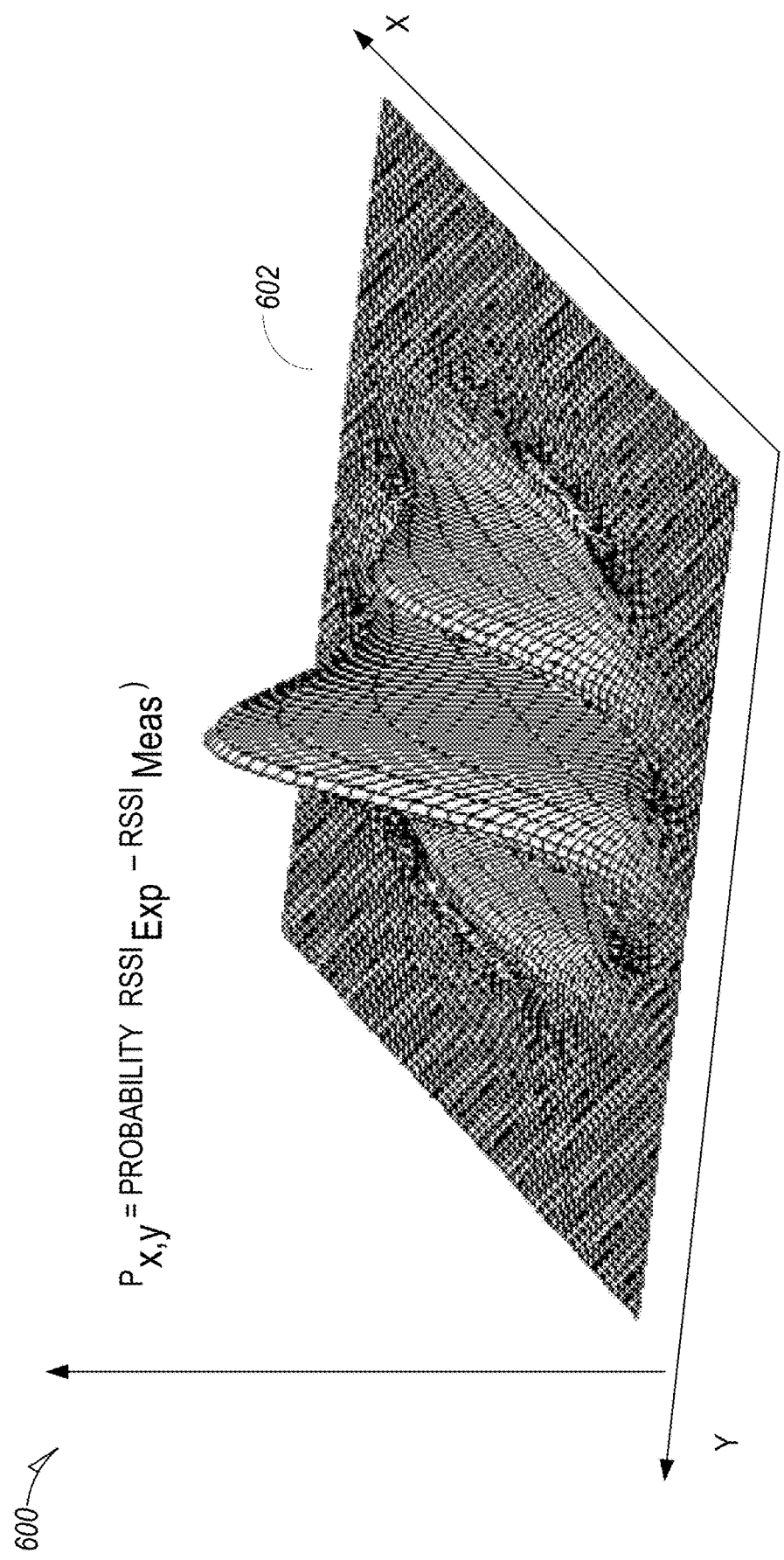
FIG. 6 is a graphical representation of a composite location probability surface.

FIG. 6 is a graphical representation 600 of an example location probability surface. As explained above, location probability surface 602 is generated based on a difference between expected received signal strength values and measured received signal strength values for a plurality of regions.

FIG. 7 illustrates a one dimensional location probability curve of a device at times t and t+1. The first graph 700a and a second graph 700b demonstrate an example shift in a location probability curve resulting from motion of a wireless terminal at a deterministic speed of d meters per second. Since some embodiments estimate speed as a deterministic number (d meters per second) a shape of a derived location probability curve at time t+1 is the same as the shape of a location probability curve at time t. Since the device is moving at a speed of d meters/sec, the location at time t+1 is given by L(t+1)=L(t)+1*d, and the probability of the device of being at any given location P(L(t+1)) is the same probability curve P(L(t)) shifted by d to the right. This is also explained above with reference to Equation 6.

Figure 8:
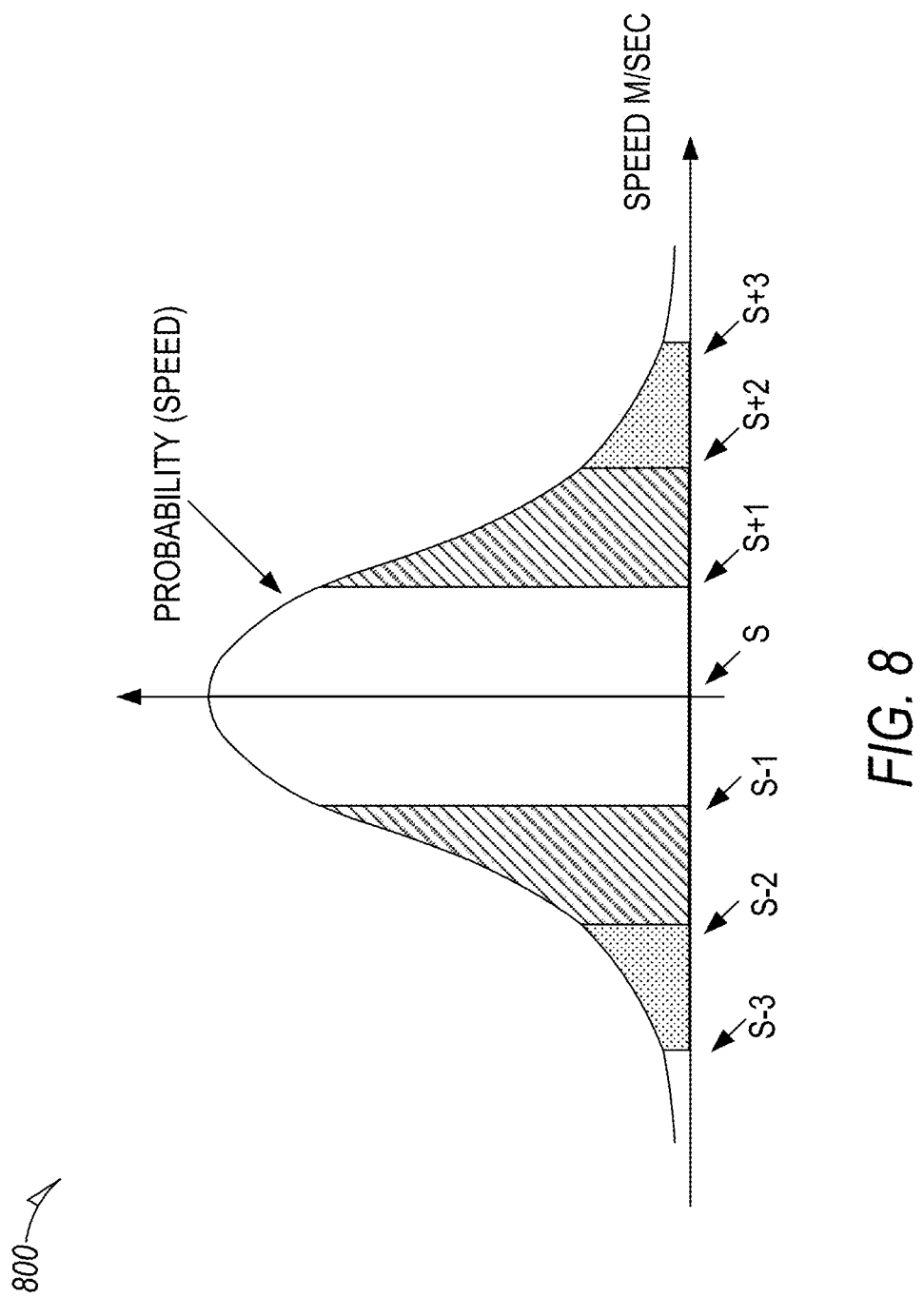
FIG. 8 illustrate a simplified speed probability in a single direction.

FIG. 8 is a graph 800 illustrating a simplified speed probability in a single direction. The curve illustrates a mean speed of s meters per second, with the highest probability. However, the device may be travelling at either higher or lower speed than s meters per second at lower probabilities. Using a motion probability curve to estimate a predicted location probability surface of a device at time t+1 based on a blended location probability surface at time t results in a predicted location probability surface at time t+1 which looks different than a location probability surface at time t or the blended location probability surface at time t.

Figure 9:
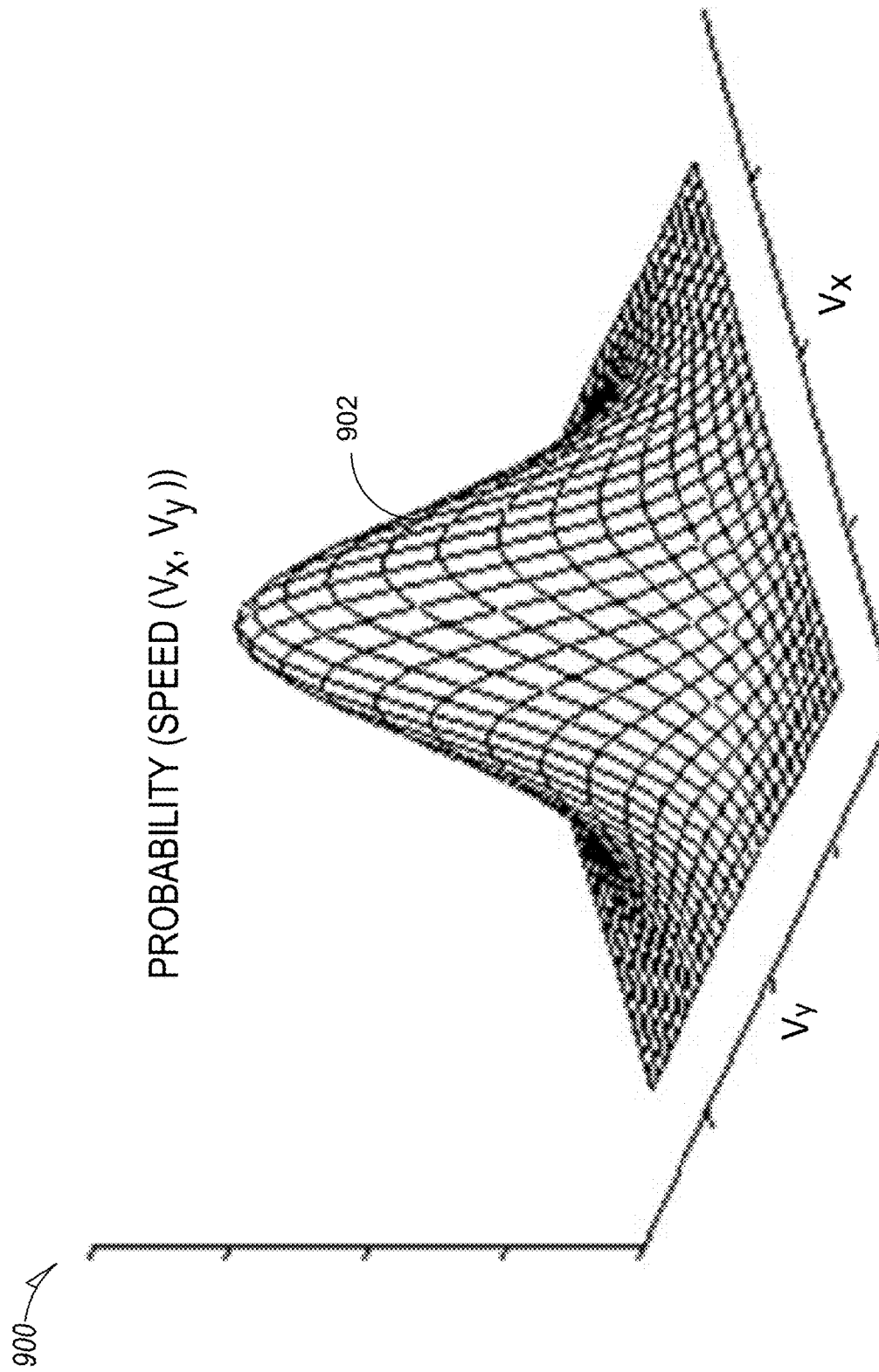
FIG. 9 illustrates a two-dimensional motion (Vx, & Vy) probability surface.

FIG. 9 is a graph 900 illustrating an example two-dimensional motion probability surface 902. In some embodiments, each cell of the motion probability surface indicates a velocity and direction, for example, via a Vx, and Vy values. In some other embodiments, motion probability is calculated for a three-dimensional space, e.g., for Vx, Vy, and Vz.

Returning to the example of a two-dimensional motion probability surface, each cell of a motion probability surface also indicates a probability that the wireless terminal exhibits motion consistent with the motion estimates indicated by the cell. FIG. 9 shows a simplified two-dimensional representation of a motion probability surface, since it is difficult to clearly show a three-dimensional surface in a written document. A height of the motion probability surface 902 indicates a probability that the wireless terminal will exhibit the motion parameter values (e.g. $V_x$, $V_y$) corresponding to the cell.

Figure 10:
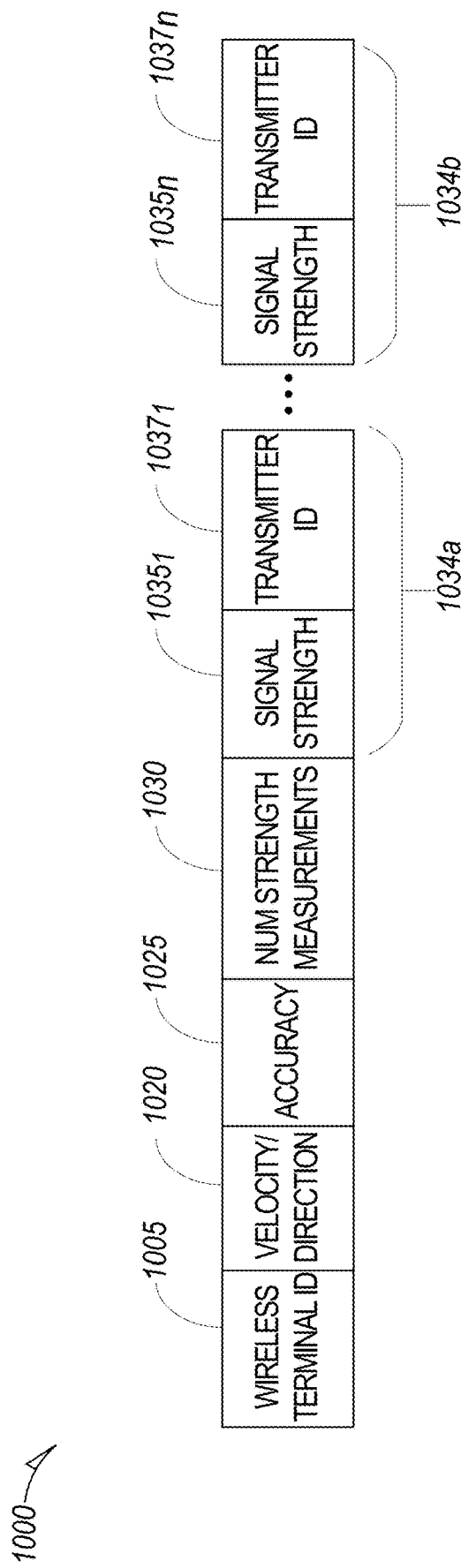
FIG. 10 shows an example message portion that is implemented in one or more of the disclosed embodiments.

FIG. 10 shows an example message portion that is implemented in one or more of the disclosed embodiments. The message portion is transmitted, in some embodiments, by a wireless terminal (e.g. 106) to a network management system (e.g. 110). The message portion 1000 includes a wireless terminal identifier field 1005, velocity/direction field 1020, an accuracy field 1025, and a number of signal strength measurements field 1030. A variable number of field pairs such as field pair 1034a and field pair 1034b follow the number of signal strength measurements field 1030. Each field pair includes a signal strength field, e.g. $1035_1 \ldots 1035_n$ and a transmitter id field e.g. transmitter id field $1037_1 \ldots$ transmitter id field $1037_n$.

The wireless terminal identifier field 1005 uniquely identifies a wireless terminal (e.g. 106) (e.g. via a station address of the wireless terminal). The velocity/direction field 1020 indicates a velocity and direction (e.g. $V_x$, $V_y$, $V_z$) of the wireless terminal identified via the wireless terminal identifier field 1005. The accuracy field 1025 indicates a variability or accuracy of the velocity/direction information included in the field 1020. In some embodiments, a wireless terminal is configured with parameters that define the accuracy field 1025. In some embodiments, the wireless terminal obtains the accuracy information stored by the accuracy field 1025 via hard coded values, for example, values hard coded and obtained from a built in accelerometer. In some embodiments, the accuracy field 1025 indicates value used to generate a probability distribution of motion values, as discussed herein with respect to a motion probability surface and, for example, FIG. 15 below.

Alternatively, the velocity/direction field provides an indication of the acceleration along the X, Y, and Z which the mobile device obtains from its internal accelerometers such as gyros.

Figure 11:
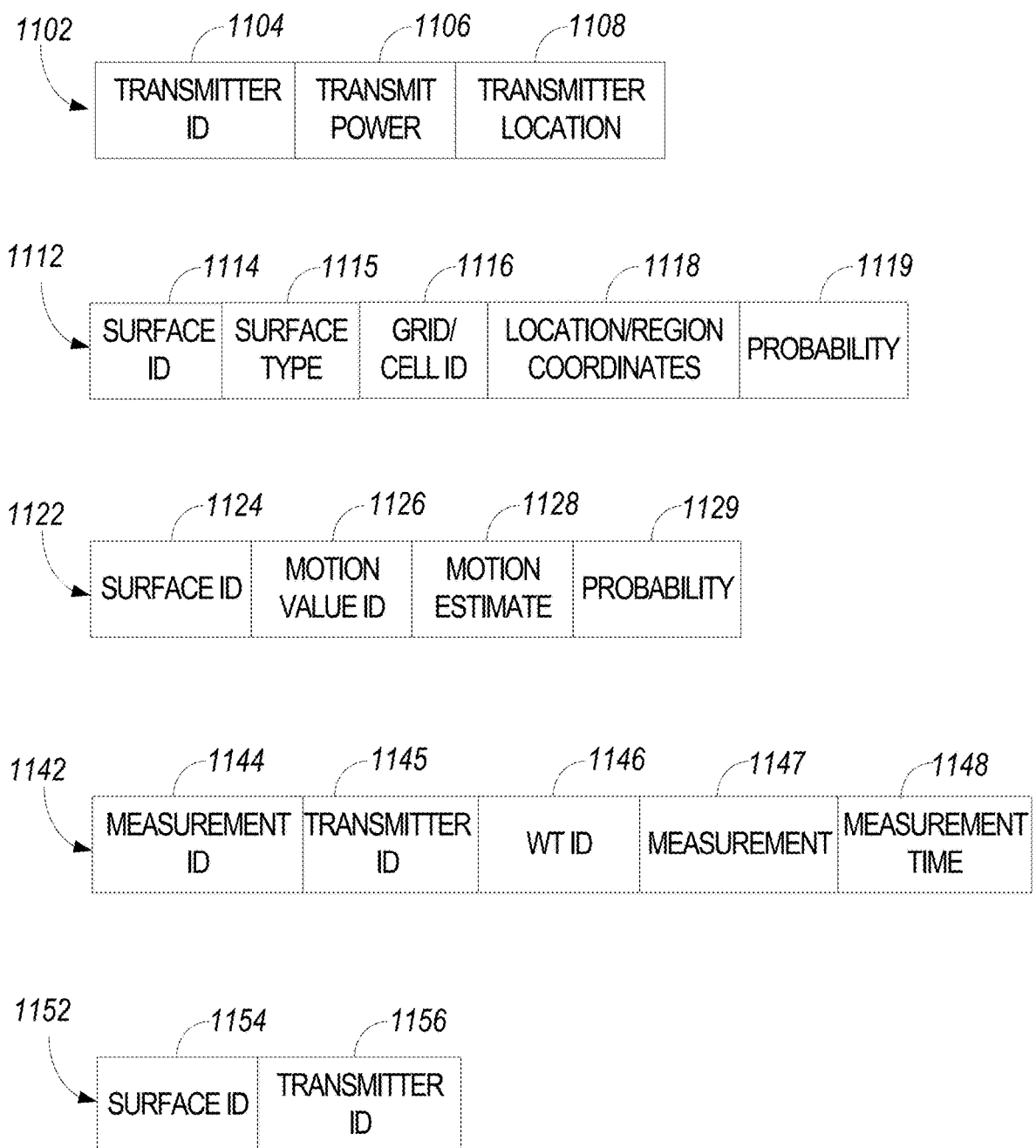
FIG. 11 shows example data structures that are implemented in one or more of the disclosed embodiments.

FIG. 11 shows example data structures that are implemented in one or more of the disclosed embodiments. While the data structures are discussed as relational database tables, one of skill would understand that the disclosed embodiments can use a variety of different data structure types, including traditional in-memory data structures such as linked lists, arrays, graphs, trees, or a non-structured data structure, hierarchical data store, object oriented data store, serialized data storage, or any other data structure architecture.

FIG. 11 shows a wireless transmitter table 1102, location probability surface table 1112, a motion probability surface table 1122, a signal table 1142, and a surface mapping table 1152. The wireless transmitter table 1102 indicates locations of known wireless transmitters. The wireless transmitter table 1102 includes, transmitter identifier field 1104, transmit power field 1106, and transmitter location field 1108. The transmitter identifier field 1104 uniquely identifies a wireless transmitter. The transmit power field 1106 indicates a power level used by the transmitter (identified via field 1104). The transmit power information included in the transmit power field 1106 is used by at least some of the disclosed embodiments to determine an expected signal strength of the wireless transmitter in different regions of different distances from the wireless transmitter. The transmitter location field 1108 indicates a geographic location of the wireless transmitter (e.g. latitude, longitude, and height e.g., above floor level, values). The transmitter location information included in the transmitter location field 1108 is used by at least some of the disclosed embodiments to calculate a distance between the wireless transmitter and different regions (e.g. 114*a-c*) within a geographic area (e.g. 112).

The location probability surface table 1112 includes a surface identifier field 1114, surface type field 1115, grid/cell identifier field 1116, location/region coordinates field 1118, and a probability field 1119. The surface identifier field 1114 uniquely identifies a surface. The identified surface can be a location probability surface (based on signal strength information from a single wireless transmitter), or a composite location probability surface (based on multiple location probability surfaces), a predicted location probability surface, or a blended location probability surface. The surface type field 1115 indicates a type of surface. For example, the surface type field 1115 indicates, in various embodiments, whether the surface (identified via field 1114) is a location probability surface, predicted location probability surface, blended location probability surface, or composite location probability surface. The grid/cell identifier field 1116 uniquely identifies a cell/grid or region included in the surface. For example, in some embodiments, the field 1116 identifies one of the regions 114*a-c* shown in FIG. 1. The location/region coordinates field 1118 defines boundaries of a region corresponding to the grid or cell identified in field 1116. For example, in some embodiments, the field 1118 defines coordinates of center of a geographic region (e.g. any one of 114*a-c*). The probability field 1119 stores a probability value that a wireless terminal is located within the region (represented by the grid/cell identified via grid/cell identifier field 1116). Note that each row of the example location probability surface table 1112 represents a single cell in a probability surface. Thus, surfaces, which typically include multiple cells, are represented by the location probability surface table 1112 via multiple rows, each row having an equivalent surface identifier field 1114 value, but different grid/cell id field 1116 values. Other methods of representing a probability surface are contemplated by the disclosed embodiments and are not limited by the example representation provided by FIG. 11.

The motion probability surface table 1122 includes a motion probability surface identifier field 1124, motion estimate identifier field 1126, motion estimate field 1128, and probability field 1129. The motion probability surface identifier field 1124 uniquely identifies a motion probability surface. For example, in some embodiments, a motion probability surface for a particular wireless terminal is generated at each time reference, such as the time references T0-T4 illustrated in FIG. 3. In some embodiments, the motion probability surface surface ID 1124 is equivalent to a unique wireless terminal ID such as WT ID 1005 of FIG. 10. Some embodiments generate motion probability surfaces for a plurality of different wireless terminals. Each of these different motion probability surfaces would be distinguished and identified via the motion probability surface identifier field 1124 which identifies the specific wireless terminal associated with said motion probability surface. The motion estimate identifier field 1126 uniquely identifies a particular cell or motion estimate/probability included in the motion probability surface. The motion estimate field 1128 indicates one possible motion estimate of a wireless terminal at a specific time. The motion estimate field 1128 is represented, in some embodiments, via a $V_x$, $V_y$, and $V_z$ value. Other embodiments represent motion using other parameters. The probability field 1129 stores a probability that the wireless terminal exhibits motion according to that specified by the motion estimate field 1128 at the specific time. Note that each row of the motion probability surface table 1122 represents a single cell in a motion probability surface. Thus, motion probability surfaces, which typically include multiple cells, are represented by the motion probability surface table 1122 via multiple rows, each row having the same surface identifier field 1124 value, but different motion value id fields 1126. Other methods of representing a motion probability surface are contemplated by the disclosed embodiments and are not limited by the example representation provided by FIG. 11.

The signal table 1142 includes a measurement identifier field 1144, transmitter identifier field 1145, wireless terminal identifier field 1146, measurement field 1147, and a measurement time field 1148. The measurement identifier field 1144 uniquely identifies a particular signal measurement. The transmitter identifier field 1145 identifies a wireless transmitter generating the signal. The wireless terminal identifier field 1146 identifies a wireless terminal measuring the signal. The measurement field 1147 stores a value of the signal (generated by transmitter identified via transmitter identifier field 1145) measurement by the wireless terminal (identified via 1146). The measurement time field 1148 identifies a time at which the measurement was either performed or received by a network management system (e.g. 110).

The surface mapping table 1152 includes a surface identifier field 1154, and a wireless transmitter identifier field 1156. The surface identifier field 1154 uniquely identifies a probability surface. In some embodiments, the surface identifier field 1154 is cross-referenced with the surface identifier field 1114. The wireless transmitter identifier field 1156 identifies a wireless transmitter. In some embodiments, the wireless transmitter identifier field 1156 identifies a wireless transmitter from which signals are measured to generate the surface that is identified by the surface identifier field 1154.

Figure 12:
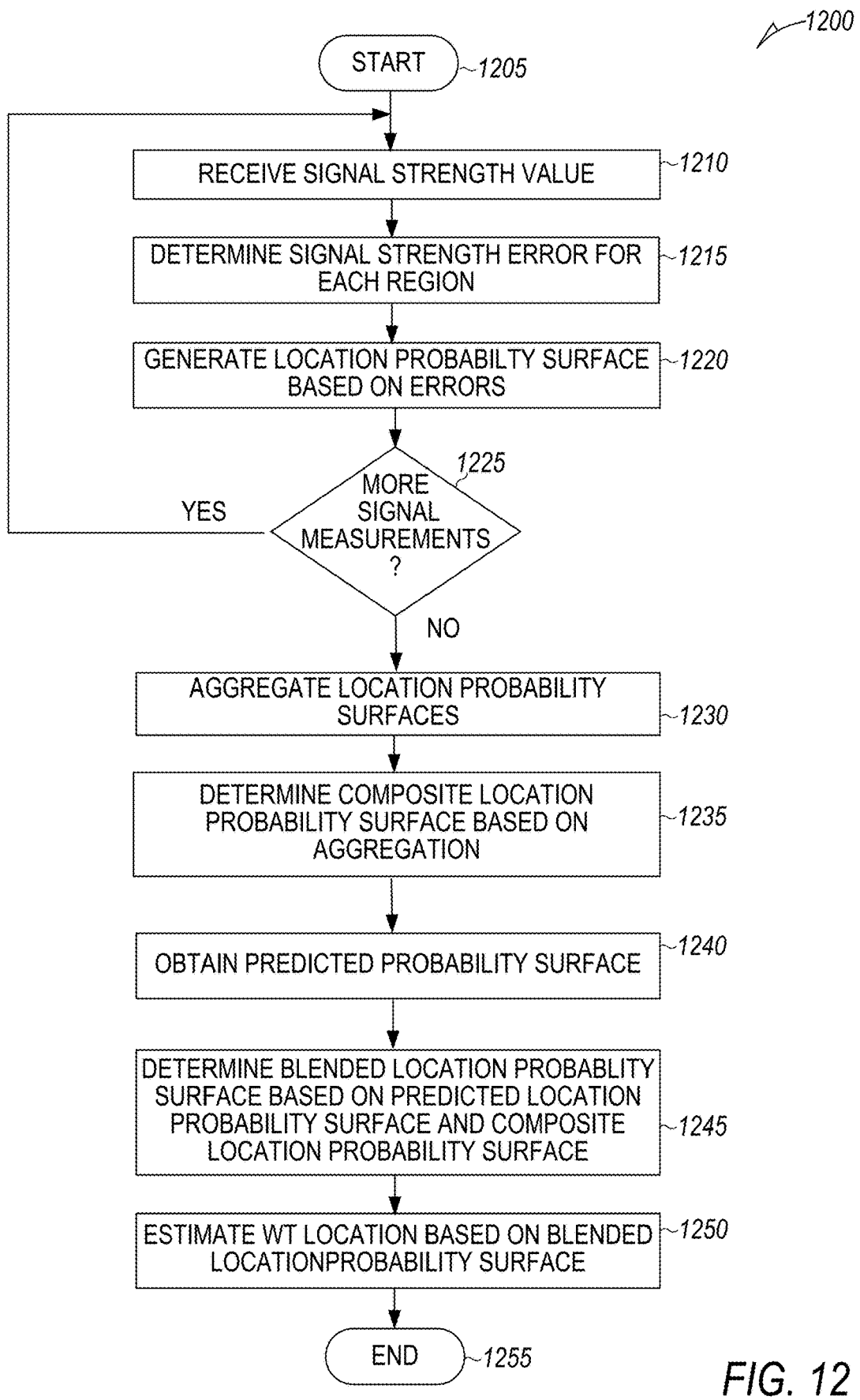
FIG. 12 is a flowchart of a process for estimating a location of a wireless terminal.

FIG. 12 is a flowchart of a process for estimating a location of a wireless terminal. In some embodiments, one or more of the functions discussed below with respect to FIG. 12 and the process 1200 is performed by hardware processing circuitry. For example, in some embodiments, instructions (e.g. 1724 discussed below with respect to FIG. 17) stored in an electronic memory (e.g. 1704 and/or 1706 discussed below with respect to FIG. 17) configure hardware processing circuitry (e.g. 1702 discussed below with respect to FIG. 17) to perform one or more of the functions discussed below.

After start operation 1205, the process 1200 moves to operation 1210, where a signal strength value is received. In some embodiments, the signal strength value is represented via a received signal strength indication (RSSI). The signal strength represents strength of a signal received by the wireless terminal originating from a wireless transmitter. The signal strength is measured by a wireless terminal (e.g. 106). For example, as discussed above with respect to FIG. 1, the wireless terminal 106 receives signals from one or more wireless transmitters such as one or more of the access points 102*a-d*. The signal strength value is received, in some embodiments, by the network management system 110 from a wireless terminal (e.g. 106). The signal strength value is received in a message in some embodiments. The message is received, in some embodiments, indirectly from the wireless terminal via an access point (e.g. 102*a-d*).

In operation 1215, a signal strength error is determined for a plurality of regions in a geographic area. For example, as discussed above with respect to FIG. 1, a geographic area is divided into a plurality of regions (e.g. 114*a-c*). An expected signal strength for each region is determined based on a distance between the wireless transmitter and a center point or other representative point of the respective region. The expected signal strength is further based, in some embodiments, on a transmit power of the wireless transmitter. For example, in some embodiments, the network management system 110 receives transmit power information from one or more of the access points 102*a-d*. In some embodiments, the network management system, e.g., 110, controls a transmission power of the AP. This transmit power information is then used to determine the expected signal strength for each region based on the distance between the wireless transmitter and the region. Operation 1215 then relates the received signal strength value of operation 1210 to the expected signal strength to determine a signal strength error for the region. For example, in some embodiments, a difference between the received signal strength and the expected signal strength for the region is determined. The difference is the signal strength error in some embodiments. In some embodiments, an absolute value of the difference is the signal strength error. In some embodiments, the error for each region is determined according to Equation 2, discussed above. Thus, when determining probabilities that a wireless terminal is located in each region corresponding to a cell or grid location of a location probability surface, each probability of the location probability surface is based on a respective difference between the signal strength measurement upon which the surface is based and an expected signal strength of the wireless terminal when located in a region corresponding to the respective probability.

In operation 1220, a probability surface is generated based on the errors. A probability surface defines a correspondence between each region (e.g. any one of 114*a-c*) and a probability that the wireless terminal is located in the region. Thus, the probability surface defines a probability for each region of the surface. In some embodiments, the probability is inversely proportional to the error for the region. Thus, regions having low error are more likely to represent a location of the wireless terminal than regions having higher errors. Some embodiments use a Gaussian estimation to generate a probability of a region based on the error of the region.

Decision operation 1225 determines if there are additional signal measurements available. For example, additional signal measurements may be made of signals generated by other wireless transmitters (e.g. a different wireless transmitter for each iteration of operations 1210, 1215, and 1220. If there are additional signal measurements, the process 1200 returns to operation 1210, and generates an additional location probability surface. Otherwise, the process 1200 moves from decision operation 1225 to operation 1230, which aggregates the location probability surfaces generated in the iterations of operation 1210, 1215, and 1220 described above. For example, some embodiments aggregate corresponding probabilities in a first location probability surface and a second location probability surface. Aggregating the location probability surfaces includes, in some embodiments, multiplying probabilities in corresponding cells or grids of each surface (e.g. probabilities relating to the same region, grid, or cell of the different probability surfaces).

In operation 1235, a composite location probability surface is determined based on the aggregation. In other words, a composite location probability surface is comprised of the aggregated probabilities of operation 1230. Thus, corresponding cells of the location probability surfaces are aggregated, and the resulting value (probability) is stored in a corresponding cell of the composite location probability surface.

In operation 1240, a predicted location probability surface is obtained. Generation of a predicted location probability surface is explained further with respect to FIG. 14 below. As discussed above with respect to FIG. 3, a predicted location probability surface is generated based on a motion probability surface (or motion estimates of the WT) and one or more blended location probability surfaces from prior time periods or references. Equation 6 provides one example embodiment of how a predicted location probability surface is generated.

As discussed above, a motion probability surface defines possible motion directions and magnitudes along with a probability that the wireless terminal has each of the defined directions and magnitudes at the respective time. Thus, each cell or grid of the motion probability surface indicates a velocity direction and magnitude, (e.g. Vx, Vy, Vz), and a probability that the wireless terminal moved at that velocity magnitude and direction over a relevant time period. Motion probability surfaces are discussed in this disclosure. While some embodiments represent possible motion values using a motion probability surface, other data structures are used in other embodiments. For example, a multi-dimensional array is used in some embodiments, with a probability and motion value defined by each "row" of the multi-dimensional (e.g. column) array.

In operation 1245, a blended location probability surface is determined. The blended location probability surface is based on the composite location probability surface determined in operation 1235. As discussed above, for example with respect to FIG. 3, the blended location probability surface is also based on a predicted location probability surface One embodiment of generating a predicted location probability surface based on the motion probability surface is discussed below with respect to FIG. 14. Other methods are also within the scope of the disclosed embodiments.

In operation 1250, a location of the wireless terminal is determined based on the blended location probability surface. For example, in some embodiments, as discussed above, a region having a highest indicated probability associated with it in the blended location probability surface is used as the estimated location. If multiple regions have the same highest probability, an area that aggregates the two regions may be used as the estimated location. In some embodiments, regions represented by the blended location probability surface are ranked according to their associated probabilities. A predetermined number of regions or a predetermined percentage of regions having the largest probabilities are identified. The identified regions are then used in determining the location estimate, with other regions excluded from the location estimate. In other embodiments, a weighted mean of contiguous regions is used to estimate the location of the wireless terminal. After the location of the wireless terminal is estimated, the process 1200 moves to end block 1255.

FIG. 13 is a flowchart of a process for determining motion estimates for a wireless terminal. The motion estimates define a plurality of possible distinct motion parameter sets for a wireless terminal. For example, in some embodiments, each of the motion parameter sets indicate a direction and magnitude (e.g. via Vx, Vy, and Vz values) of the wireless terminal. Associated with each of the motion estimates is a probability that a wireless terminal exhibits motion in accordance with the motion estimate. In some embodiments the plurality of motion estimates and probabilities for a wireless terminal at a particular time are represented as a motion probability surface. A motion probability surface generally defines possible motion of a wireless terminal at a specific time. For example, if a first and second blended location probability surface are determined for a first and second time period respectively, a motion probability surface can determine possible motion of the wireless terminal during a time spanning the first and second time periods to help explain how the wireless terminal moved between the location estimate provided by the first blended probability surface and a second location estimate provided by the second blended location probability surface.

In some embodiments, one or more of the functions discussed below with respect to FIG. 13 and the process 1300 are performed by hardware processing circuitry. For example, in some embodiments, instructions (e.g. 1724 discussed below with respect to FIG. 17) stored in an electronic memory (e.g. 1704 and/or 1706 discussed below with respect to FIG. 17) configure hardware processing circuitry (e.g. 1702 discussed below with respect to FIG. 17) to perform one or more of the functions discussed below.

After start operation 1305, one or more blended location probability surfaces for the wireless terminal are determined in operation 1310. For example, as discussed above with respect to FIG. 3, blended probability surfaces 308a and 308b are provided as input when generating motion probability surface 306c or motion estimates and probabilities organized in another form. An example of a determination of a blended location probability surface is described above with respect to FIG. 12 and operation 1245.

In operation 1325, motion information is received from the wireless terminal. This motion information indicates, in various embodiments, one or more of a speed of the wireless terminal, acceleration information for the wireless terminal, and a direction of the wireless terminal. The motion information indicates accelerations of the wireless terminal in three dimensions, in at least some embodiments. The motion information also indicates, in some embodiments, a variability or accuracy of the direction, speed, and/or acceleration information.

In operation 1330, the motion estimates are generated based on the received motion information and the one or more blended location probability surfaces. In some embodiments, the motion estimates determine velocity in two or three dimensions based on location estimates derived from each of the blended location probability surfaces (e.g. highest probability region in each surface, or other methods discussed above). These velocity estimates are then augmented by integrating the acceleration information within a time period to which the velocity estimates pertain. In some embodiments, the acceleration information received from the wireless terminal (e.g. via operation 1325) is integrated over half of the applicable time period and added to the velocity estimates derived from the blended probability surfaces. Given the accelerometer in wireless terminals is subject to drift, augmenting the velocity estimates provided by the blended location probability surfaces by integrating the acceleration over a single time period prevents a built up of error which could otherwise accumulate if acceleration was integrated over multiple time periods.

As discussed above, in some embodiments, the motion estimates generated in operation 1330, along with their associated probabilities, are represented as a motion probability surface. One embodiment of operation 1330 is discussed below with respect to FIG. 15 and the process 1500. In operation 1335, probabilities for each of the motion estimates are determined. In some embodiments, operation 1335 collectively conforms the probabilities for the motion estimates to a predetermined distribution, such as a Gaussian distribution. After operation 1335 completes, the process 1300 moves to end operation 1340.

FIG. 14 is a flowchart of a process for generating a predicted location probability surface. As discussed above with respect to FIG. 3, a predicted location probability surface is generated at a first time reference (or period), and predicts a probability surface of a wireless terminal at a future time reference (or time period). For example, FIG. 14 shows a blended location probability surface for a time T1. A motion probability surface for time T1 is referenced, and a predicted location probability surface for time T2 is referenced. These different time references associated with these various surfaces is consistent with the explanation of FIG. 3 above, which shows a blended location probability surface 308c from time reference T2 and motion estimates 306c (represented as a motion probability surface in at least some embodiments) from time reference T2 used to generate a predicted location probability surface 307d for time reference T3.

In some embodiments, one or more of the functions discussed below with respect to FIG. 14 and the process 1400 is performed by hardware processing circuitry. For example, in some embodiments, instructions (e.g. 1724 discussed below with respect to FIG. 17) stored in an electronic memory (e.g. 1704 and/or 1706 discussed below with respect to FIG. 17) configure hardware processing circuitry (e.g. 1702 discussed below with respect to FIG. 17) to perform one or more of the functions discussed below.

After start operation 1405, the process 1400 moves to operation 1410, which selects a region or location cell in a blended location probability surface The blended location probability surface is generated for a time T=1.

In operation 1415, a cell in a motion probability surface is selected. The motion probability surface is for a time T=1. In operation 1420, a probability defined by the selected motion cell is obtained. A motion estimate of the wireless terminal defined by the cell is also obtained. In various embodiments, the motion estimate defines velocities in one or more of an x, y, and z direction (e.g. $V_x$, $V_y$, $V_z$).

In operation 1425, a new location is determined based on the selected location cell and the motion information. For example, operation 1425 determines the new location or resulting region by determining in which region the wireless terminal would be located if it exhibited the motion defined by the motion estimate for a time interval. The time interval, in some embodiments, is an elapsed time between two sequentially determined blended location probability surfaces (e.g. elapsed time between t=1 and t=2).

In operation 1430, a probability that the wireless terminal moves to the new location cell is determined. This probability is based on two probabilities. A first probability is a probability associated with the selected location cell (e.g. from operation 1410). A second probability is associated with the selected cell of the motion probability surface (e.g. via operation 1415). These two probabilities are aggregated (e.g. multiplied in some embodiments) to arrive at a probability of a wireless terminal in the selected location exhibiting the motion and moving to the new location. In operation 1435, the resulting probability is associated with the cell corresponding to the new location.

Decision operation 1440 determines if there are additional motion estimates (e.g. cells in the motion probability surface) for the wireless terminal. If there are, processing returns to operation 1415 and a different motion estimate (e.g. cell in the motion probability surface) is selected. Otherwise, the process 1400 moves from decision operation 1440 to decision operation 1445.

Decision operation 1445 determines if there are additional regions or cells in the blended location probability surface to process. If not, the process 1400 moves to operation 1450. Otherwise, processing returns to operation 1410 and a different region or cell is selected.

In operation 1450, corresponding probabilities determined by operation 1430/1435 are aggregated. In other words, probabilities associated with the same region or cell in the new predicted location probability surface are aggregated (e.g. added). In other words, if two or more motion estimates included in the motion probability surface have equivalent resulting regions, probabilities associated with those motion estimates are aggregated and assigned to a corresponding region in the predicted location probability surface. Thus, the predicted location probability surface indicates a probability that a wireless terminal will be located in a particular region based on an aggregated probability of the region. The new predicted location probability surface corresponds to location of WT at time T2. (e.g. one time period subsequent to the blended location probability surface of operation 1410 and one time period subsequent to the motion estimates or motion probability surface of operation 1415). After operation 1450, the process 1400 moves to end operation 1455.

Figure 15:
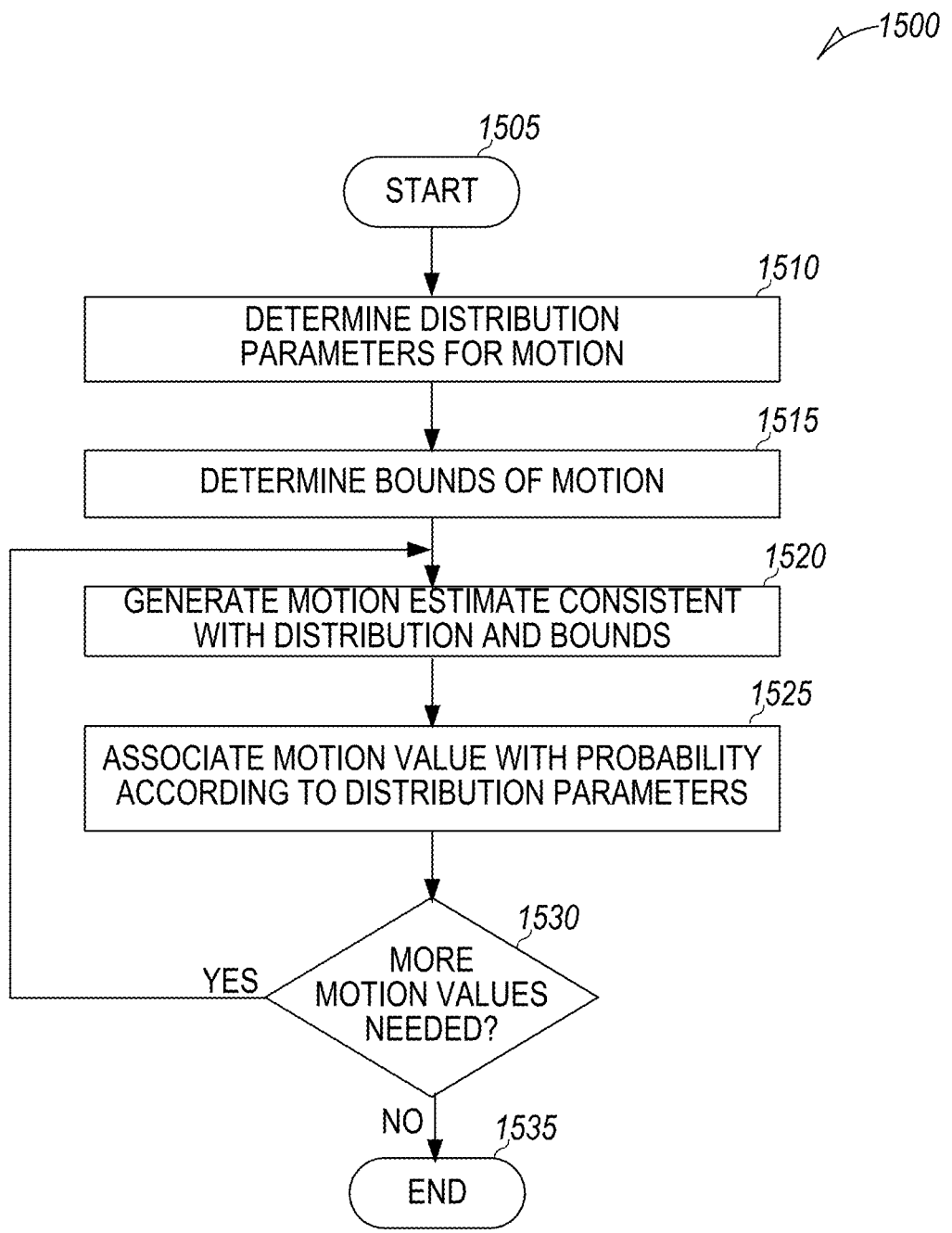
FIG. 15 is a flowchart of a process for determining a motion probability surface.

FIG. 15 is a flowchart of a process for determining a plurality of different motion estimates for a wireless terminal. In some embodiments, these motion estimates are represented as a motion probability surface. In other embodiments, the motion estimates of a wireless terminal are represented as a group of data values defining the motion estimates and the probabilities that the WT moves at the specific speed and direction, for example, using an array or other data structure configured to store a plurality of data values. In some embodiments, one or more of the functions discussed below with respect to FIG. 15 and the process 1500 is performed by hardware processing circuitry. For example, in some embodiments, instructions (e.g. 1724 discussed below with respect to FIG. 17) stored in an electronic memory (e.g. 1704 and/or 1706 discussed below with respect to FIG. 17) configure hardware processing circuitry (e.g. 1702 discussed below with respect to FIG. 17) to perform one or more of the functions discussed below.

After start operation 1505, the process 1500 moves to operation 1510. In operation 1510, probability distribution parameters for motion of a wireless terminal are determined. In some aspects, the probability distribution parameters are determined based on variability information in the motion of the wireless terminal. For example, in some aspects, the probability distribution parameters are based on the accuracy field 1025. In some aspects, the probability distribution parameters define a type of probability distribution. For example, the probability distribution parameters define, in some embodiments whether the probability distribution is a Gaussian distribution, a Cauchy distribution, a Behrens-Fisher distribution, a Laplace distribution, or any other type of probability distribution.

In operation 1515, bounding parameters on the motion determined. For example, in some embodiments, an average motion value or mean motion value is determined. In some embodiments, limits on the motion are determined. For example, some embodiments of operation 1515 determines motion values (e.g. motion estimate field 1128) that define lower and upper percentiles of the distribution. In some embodiments, motion estimate limits are based on the lower and upper percentiles. In some embodiments, the limits are based on multiples of a standard deviation of motion values. For example, some embodiments limit the generated motion estimates to no more than five standard deviations from a mean motion estimate.

In operation 1520, a motion estimate is generated (e.g. as stored in motion estimate field 1128). The motion estimate is generated based on the determined bounds of motion and the distribution parameters in some embodiments. In some embodiments, the motion estimate is generated based on one or more blended location probability surfaces, as described above with respect to FIG. 3 (e.g. blended location probability surfaces 308a and 308b are used to generate motion estimates 306c (in some embodiments represented as a motion probability surface). This is also referenced above with respect to operation 1310. In some embodiments, the motion estimate is generated based on acceleration information provided by the wireless terminal (e.g. as described above with respect to operation 1325).

In operation 1525, a motion value is associated with a motion probability according to the distribution parameters. For example, in a normal or Gaussian distribution, values closer to the mean are more numerous than values further from the mean. Thus, operation 1525 associates motion values with their probability of occurrence so as to build a probability distribution of motion values in accordance with the motion parameters (variance, bounds, median, or mean), and distribution parameters. Thus, a result of operation 1525 is a motion estimate and associated motion probability. Thus, the motion estimates included in a motion probability surface have associated motion probabilities.

Decision operation 1530 determines whether more motion values are needed to complete the distribution. If more values are needed, the process 1500 returns to operation 1520. Otherwise, the process 1500 moves from decision operation 1530 to end operation 1535.

Figure 16:
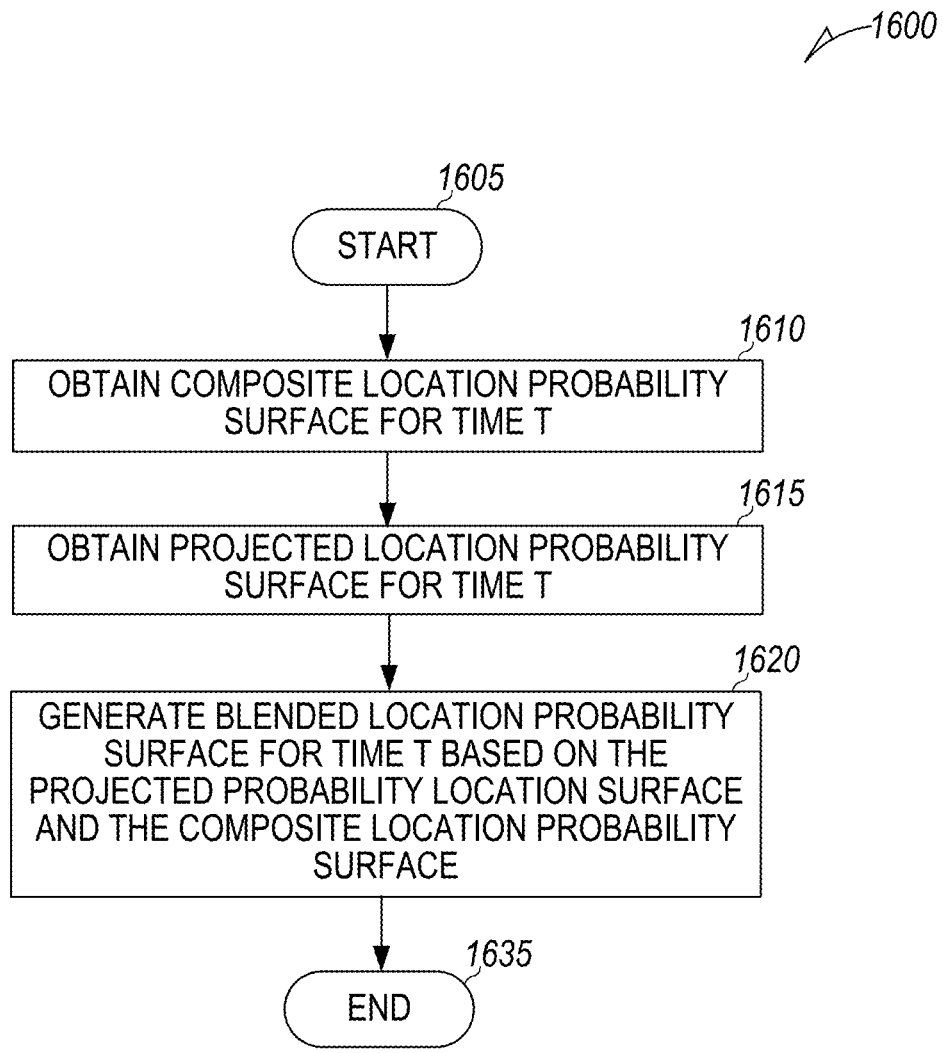
FIG. 16 is a flowchart of a process for determining a blended location probability surface.

FIG. 16 is a flowchart of a process for determining blended probably surface for a wireless terminal based on a predicted location probability surface and a composite location probability surface. For example, the process 1600 discussed below with respect to FIG. 16 represents one example embodiments of how the blended location probability surface 308d is generated based on predicted location probability surface 307d and composite location probability surface 304d.

In some embodiments, one or more of the functions discussed below with respect to FIG. 16 and the process 1600 is performed by hardware processing circuitry. For example, in some embodiments, instructions (e.g. 1724 discussed below with respect to FIG. 17) stored in an electronic memory (e.g. 1704 and/or 1706 discussed below with respect to FIG. 17) configure hardware processing circuitry (e.g. 1702 discussed below with respect to FIG. 17) to perform one or more of the functions discussed below.

After start operation 1605, the process 1600 moves to operation 1610. In operation 1610, a composite location probability surface is obtained. For example, in some embodiments operation 1610 includes operations 1210-1235, discussed above with respect to FIG. 12.

Operation 1615 obtains a predicted location probability surface. In some embodiments, operation 1615 obtains a predicted location probability surface according to the process 1400, discussed above with respect to FIG. 14. For example, a predicted location probability surface for time T is based, in some embodiments, on one or more blended location probability surfaces for times T−1, T−2, etc. and a motion surface generated at time T−1 or motion estimates for the mobile terminal at time T−1.

Operation 1620 generates a blended location probability surface for time T based on the predicted location probability surface and the composite location probability surface. In some embodiments, operation 1620 averages corresponding cells or regions of each of the composite location probability surface and the predicted location probability surface to generate a corresponding cell or region of the blended location probability surface. Corresponding cells in this context are cells representing equivalent geographical regions. In some embodiments, a weighted average is used to generate the blended location probability surface, with probabilities indicated by the composite location probability surface given a first weight and probabilities indicated by the predicted location probability surface given a second different weight. After operation 1620 completes, the process 1600 moves to end operation 1635.

Figure 17:
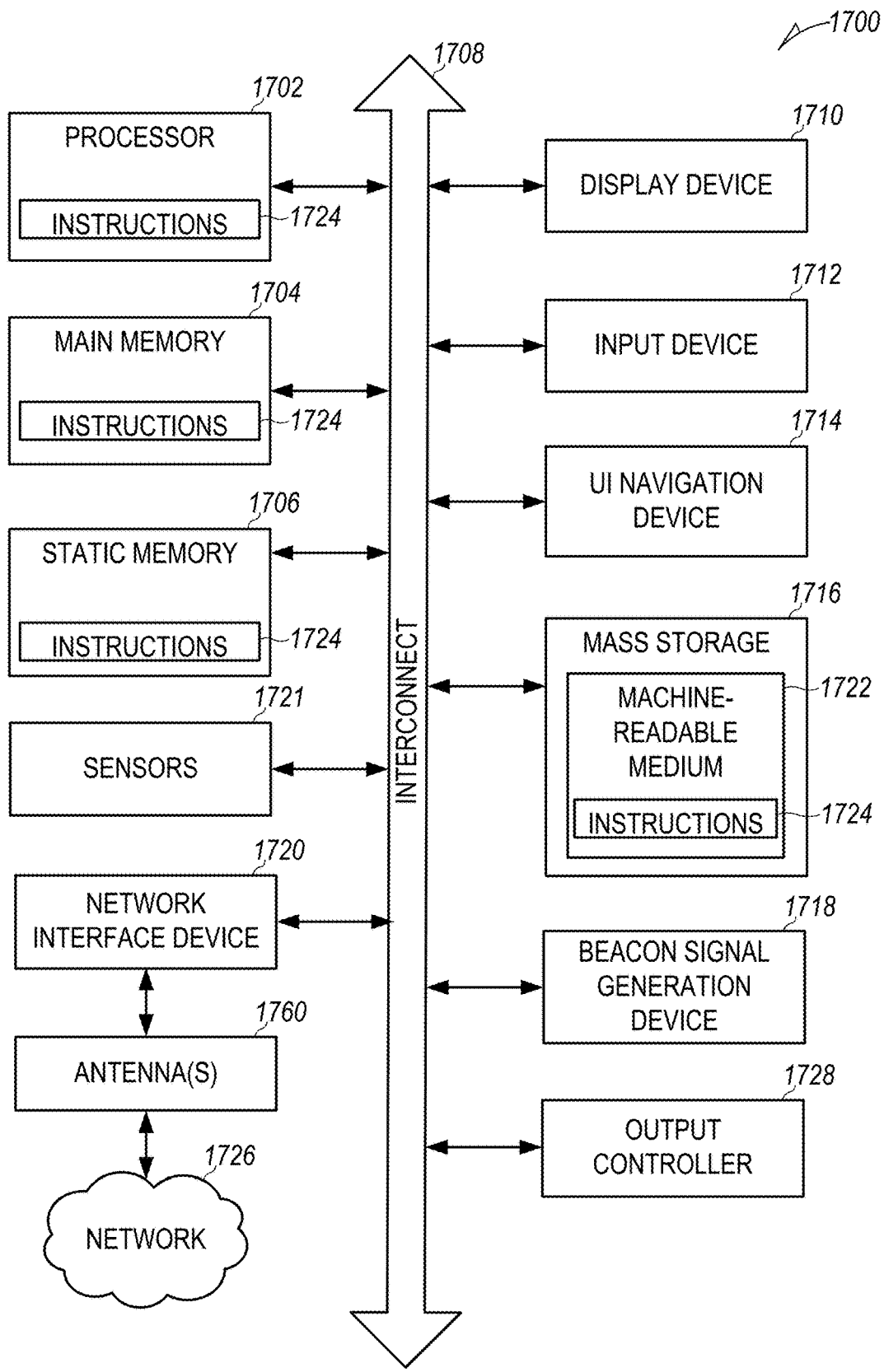
FIG. 17 illustrates a block diagram of an example machine upon which any one or more of the techniques (e.g., methodologies) discussed herein may be performed.

FIG. 17 illustrates a block diagram of an example machine 1700 upon which any one or more of the techniques (e.g., methodologies) discussed herein may perform. Machine 1700 (e.g., computer system) may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink 1708 (e.g., bus).

Specific examples of main memory 1704 include Random Access Memory (RAM), and semiconductor memory devices, which may include, in some embodiments, storage locations in semiconductors such as registers. Specific examples of static memory 1706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1700 may further include a display device 1710, an input device 1712 (e.g., a keyboard), and a user interface (UI) navigation device 1714 (e.g., a mouse). In an example, the display device 1710, input device 1712 and UI navigation device 1714 may be a touch screen display. The machine 1700 may additionally include a mass storage device (e.g., drive unit) 1716, a beacon signal generation device 1718, a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1702 and/or instructions 1724 may comprise processing circuitry and/or transceiver circuitry.

The mass storage device 1716 may include a machine readable medium 1722 on which is stored one or more sets of data structures or instructions 1724 (e.g., software) embodying or utilized by any one or more of the techniques or functions described herein. The machine readable medium 1722 is a non-transitory computer readable storage medium in at least some embodiments. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the mass storage device 1716 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1722 is illustrated as a single medium, the term "machine readable medium" may include a single medium or multiple media (e.g., a centralized or distributed database, and/or associated caches and servers) configured to store the instructions 1724.

An apparatus of the machine 1700 may be one or more of a hardware processor 1702 (e.g., a central processing unit (CPU), a graphics processing unit (GPU), a hardware processor core, or any combination thereof), one or more hardware memories, including one or more of a main memory 1704 and a static memory 1706. The apparatus of the machine 1700 also includes, in some embodiments, one or more sensors 1721, network interface device 1720, one or more antennas 1760, a display device 1710, an input device 1712, a UI navigation device 1714, a mass storage device 1716, instructions 1724, a beacon signal generation device 1718, and an output controller 1728. The apparatus may be configured to perform one or more of the methods and/or operations disclosed herein. The apparatus may be intended as a component of the machine 1700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1720 may include one or more physical jacks (e.g., Ethernet, coaxial, or phone jacks) or one or more antennas to connect to the communications network 1726. In an example, the network interface device 1720 may include one or more antennas 1760 to wirelessly communicate using at least one of single-input multiple-output (SIMO), multiple-input multiple-output (MIMO), or multiple-input single-output (MISO) techniques. In some examples, the network interface device 1720 may wirelessly communicate using Multiple User MIMO techniques. The term "transmission medium" shall be taken to include any intangible medium that is capable of storing, encoding or carrying instructions for execution by the machine 1700, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a system, comprising: hardware processing circuitry; one or more hardware memories storing instructions that when executed configure the hardware processing circuitry to perform operations comprising: receiving, from a wireless terminal, a signal strength measurement of a signal received by the wireless terminal, the signal generated by a first wireless transmitter; determining, for each of a plurality of regions, an expected signal strength of the signal from the wireless transmitter in the respective region; determining, for each of the plurality of regions, a corresponding first difference between the expected signal strength in the respective region and the signal strength measurement; determining, for each of the plurality of regions, a corresponding first probability that the wireless terminal is located in the respective region based on one of the first differences that corresponds to the respective region; estimating a first location of the wireless terminal at a first time based on the determined first probabilities.

In Example 2, the subject matter of Example 1 optionally includes wherein each of the regions of the plurality of regions represents a two-dimensional geographic area or a three-dimensional geographic volume.

In Example 3, the subject matter of any one or more of Examples 1-2 optionally include the operations further comprising: receiving, from the wireless terminal, a second signal strength measurement of a second signal received by the wireless terminal and generated by a second wireless transmitter; determining, for each of the plurality of regions, a corresponding second expected signal strength of the signal from the second wireless transmitter in the respective region; determining, for each of the plurality of regions, a corresponding second difference between the second expected signal strength in the respective region, and the second signal strength measurement; determining, for each of the plurality of regions, a corresponding second probability that the wireless terminal is located in the respective region based on one of the second differences that corresponds to the respective region, wherein the estimating of the first location of the wireless terminal is further based on the determined second probabilities.

In Example 4, the subject matter of any one or more of Examples 2-3 optionally include the operations further comprising: aggregating, for each of the plurality of regions, the first and second probabilities corresponding to the respective region, wherein the estimating of the first location is based on the aggregated first and second probabilities.

In Example 5, the subject matter of any one or more of Examples 3-4 optionally include the operations further comprising: receiving acceleration information from the wireless terminal; generating a plurality of motion estimates of the wireless terminal based on the acceleration information; generating associated motion probabilities for the plurality of motion estimates; generating a predicted location probability surface, the generating of the predicted location probability surface comprising for each of the plurality of regions, generating a third probability that the wireless terminal is located in the respective region based on the plurality of motion estimates and the associated motion probabilities, wherein the predicted location probability surface is generated to indicate each of the third probabilities.

In Example 6, the subject matter of Example 5 optionally includes wherein the generating of a third probability comprises determining, for each of the motion estimates, a resulting region in which the wireless terminal is located if the wireless terminal exhibits motion according to the respective motion estimate; aggregating probabilities associated with motion estimates having equivalent resulting regions, wherein the third probability of a region is the aggregated probability of the region.

In Example 7, the subject matter of any one or more of Examples 5-6 optionally include wherein the motion probabilities are generated in accordance with a predetermined distribution.

In Example 8, the subject matter of any one or more of Examples 4-7 optionally include the operations further comprising generating a first blended probability surface based on the predicted location probability surface and the aggregated first and second probabilities, wherein the estimating of the first location is based on the first blended probability surface.

In Example 9, the subject matter of Example 8 optionally includes the operations further comprising estimating a second location of the wireless terminal at a second time earlier than the first time, the estimating based on a second blended location probability surface, wherein the predicted location probability surface is based on the second blended probability surface.

In Example 10, the subject matter of Example 9 optionally includes wherein the plurality of motion estimates are determined at the second time, and the predicted location probability surface indicates probabilities that the wireless terminal is located in each of the plurality of regions at the first time.

In Example 11, the subject matter of any one or more of Examples 8-10 optionally include the operations further comprising determining a region with the largest probability in the first blended probability surface, wherein the estimating of the first location estimates the wireless terminal's location as a region associated with a largest probability indicated by the first blended probability surface.

In Example 12, the subject matter of any one or more of Examples 8-11 optionally include the operations further comprising identifying a predetermined number of regions represented by the first blended probability surface that have the largest probabilities, wherein the estimating of the first location is based on a weighted average that is based on the identified regions and excludes other regions.

In Example 13, the subject matter of Example 12 optionally includes the operations further comprising weighting each identified region based on its associated probability, wherein the estimating of the first location is based on the weight of each identified region.

In Example 14, the subject matter of any one or more of Examples 8-13 optionally include wherein the generating of the first blended location probability surface comprises averaging corresponding probabilities in the predicted location probability surface and aggregated first and second probabilities.

In Example 15, the subject matter of Example 14 optionally includes wherein the averaging of the corresponding probabilities is a weighted average.

In Example 16, the subject matter of any one or more of Examples 9-15 optionally include wherein the generating of the plurality of motion estimates is further based on a third blended location probability surface; and the operations further comprise estimating a third location of the wireless terminal at a time earlier than the second time, the estimating of the third location based on the third blended location probability surface.

Example 17 is a method of estimating a location of a wireless terminal, comprising: receiving acceleration measurements representing motion of the wireless terminal at a first time; estimating a location of the wireless terminal at the first time based on a first blended location probability surface; generating a predicted location probability surface of the wireless terminal based on the acceleration measurements and the first blended location probability surface, the predicted location probability surface indicating a plurality of probabilities that the wireless terminal is located in a corresponding plurality of geographic regions at a second time subsequent to the first time; aggregating a plurality of location probability surfaces, each location probability surface based on a signal strength at the wireless terminal of a different wireless transmitter, each location probability surface indicating a plurality of probabilities that the wireless terminal is located in the corresponding plurality of geographic regions at the second time, the aggregation generating a composite location probability surface; generating a second blended location probability surface based on the predicted location probability surface and the composite location probability surface; and estimating a second location of the wireless terminal at the second time based on the second blended location probability surface.

In Example 18, the subject matter of Example 17 optionally includes generating each of the plurality of location probability surfaces by: generating an expected signal strength of the respective wireless transmitter in each of the plurality of regions, determining, for each region, a difference between the expected signal strength in the respective region and the signal strength of the respective wireless transmitter at the wireless terminal; and generating, for each region, a probability that the wireless terminal is located in the respective region based on the difference.

In Example 19, the subject matter of any one or more of Examples 17-18 optionally include wherein the estimating of the second location of the wireless terminal at the second time is based on a second blended location probability surface, the method further comprising: estimating a third location of the wireless terminal at a time earlier than the first time based on a third blended probability surface; generating motion estimates and associated probabilities of the wireless terminal based on the third blended probability surface and the acceleration measurements, wherein the generation of the predicted location probability surface is further based on the generated motion estimates and associated probabilities.

Example 20 is a non-transitory computer readable storage medium comprising instructions that when executed configure hardware processing circuitry to perform operations to estimate a location of a wireless terminal, the operations comprising: receiving acceleration measurements representing motion of the wireless terminal at a first time; estimating a location of the wireless terminal at the first time based on a first blended location probability surface; generating a predicted location probability surface of the wireless terminal based on the acceleration measurements and the first blended location probability surface of the predicted location probability surface indicating a plurality of probabilities that the wireless terminal is located in a corresponding plurality of geographic regions at a second time subsequent to the first time; aggregating a plurality of location probability surfaces, each location probability surface based on a signal strength at the wireless terminal of a different wireless transmitter, each location probability surface indicating a plurality of probabilities that the wireless terminal is located in the corresponding plurality of geographic regions at the second time, the aggregation generating a composite location probability surface; generating a second blended location probability surface based on the predicted location probability surface and the composite location probability surface; and estimating a second location of the wireless terminal at the second time based on the second blended location probability surface.

Although the discussion above describes, in some instances, determining location of a wireless terminal in a two-dimensional space, the features described above may be applied equally to locating a wireless terminal in a three-dimensional space. As such, in a three-dimensional space, rather than determining a location of a WT in a specific cell or region, some of the disclosed embodiments determine a location of a WT within a three-dimensional region when considering a plurality of three-dimensional regions.

The invention claimed is:
1. A system, comprising:
hardware processing circuitry;
one or more hardware memories storing instructions that when executed configure the hardware processing circuitry to perform operations comprising:
receiving, from a wireless terminal, a signal strength measurement of a signal received by the wireless terminal, the signal generated by a first wireless transmitter;
determining, for each of a plurality of regions, an expected signal strength of the signal from the wireless transmitter in the respective region;
determining, for each of the plurality of regions, a corresponding first difference between the expected signal strength in the respective region and the signal strength measurement;
determining, for each of the plurality of regions, a corresponding first probability that the wireless terminal is located in the respective region based on one of the first differences that corresponds to the respective region;

receiving acceleration information from the wireless terminal:
   generating a plurality of motion estimates of the wireless terminal based on the acceleration information;
   generating associated motion probabilities for the plurality of motion estimates;
   generating a predicted location probability surface, the generating of the predicted location probability surface comprising for each of the plurality of regions, generating a third probability that the wireless terminal is located in the respective region based on the plurality of motion estimates and the associated motion probabilities, wherein the predicted location probability surface is generated to indicate each of the third probabilities; and
   estimating a first location of the wireless terminal at a first time based on the determined first probabilities and the predicted location probability surface.

2. The system of claim 1, wherein each of the regions of the plurality of regions represents a two-dimensional geographic area or a three-dimensional geographic volume.

3. The system of claim 1, the operations further comprising:
   receiving, from the wireless terminal, a second signal strength measurement of a second signal received by the wireless terminal and generated by a second wireless transmitter;
   determining, for each of the plurality of regions, a corresponding second expected signal strength of the signal from the second wireless transmitter in the respective region;
   determining, for each of the plurality of regions, a corresponding second difference between the second expected signal strength in the respective region, and the second signal strength measurement;
   determining, for each of the plurality of regions, a corresponding second probability that the wireless terminal is located in the respective region based on one of the second differences that corresponds to the respective region, wherein the estimating of the first location of the wireless terminal is further based on the determined second probabilities.

4. The system of claim 3, the operations further comprising:
   aggregating, for each of the plurality of regions, the first probability and the second probability that correspond to the respective region, wherein the estimating of the first location is based on the aggregating.

5. The system of claim 1, wherein the generating of a third probability comprises
   determining, for each of the motion estimates, a resulting region in which the wireless terminal is located by exhibiting motion according to the respective motion estimate;
   aggregating probabilities associated with motion estimates having equivalent resulting regions, wherein the third probability of a region is the aggregated probability of the region.

6. The system of claim 1, wherein the motion probabilities are generated in accordance with a predetermined distribution.

7. The system of claim 4, the operations further comprising generating a first blended probability surface based on the predicted location probability surface and the aggregation of the first probability and the second probability, wherein the estimating of the first location is based on the first blended probability surface.

8. The system of claim 7, the operations further comprising estimating a second location of the wireless terminal at a second time earlier than the first time, the estimating based on a second blended location probability surface, wherein the predicted location probability surface is based on the second blended probability surface.

9. The system of claim 8, wherein the plurality of motion estimates are determined at the second time, and the predicted location probability surface indicates probabilities that the wireless terminal is located in each of the plurality of regions at the first time.

10. The system of claim 8, wherein the generating of the plurality of motion estimates is further based on a third blended location probability surface; and the operations further comprise estimating a third location of the wireless terminal at a time earlier than the second time, the estimating of the third location based on the third blended location probability surface.

11. The system of claim 7, the operations further comprising determining a region with a largest probability in the first blended probability surface, wherein the estimating of the first location estimates the wireless terminal's location as a region associated with a largest probability indicated by the first blended probability surface.

12. The system of claim 7, the operations further comprising identifying a predetermined number of regions represented by the first blended probability surface that have higher probabilities than other regions, wherein the estimating of the first location is based on a weighted average that is based on the identified regions and excludes the other regions.

13. The system of claim 12, the operations further comprising weighting each identified region based on its associated probability, wherein the estimating of the first location is based on the weight of each identified region.

14. The system of claim 7, wherein the generating of the first blended location probability surface comprises averaging corresponding probabilities in the predicted location probability surface and the aggregation of the first probability and the second probability.

15. The system of claim 14, wherein the averaging of the corresponding probabilities is a weighted average.

16. A method of estimating a location of a wireless terminal, comprising:
   receiving acceleration measurements representing motion of the wireless terminal at a first time;
   estimating a location of the wireless terminal at the first time based on a first blended location probability surface, the first blended location probability surface indicating a plurality of probabilities that the wireless terminal is located, at the first time, in a corresponding plurality of geographic regions;
   generating a predicted location probability surface of the wireless terminal based on the acceleration measurements and the first blended location probability surface, the predicted location probability surface indicating a second plurality of probabilities that the wireless terminal is located, at a second time subsequent to the first time, in the corresponding plurality of geographic regions;
   aggregating a plurality of location probability surfaces, each location probability surface based on a signal strength at the wireless terminal of a different wireless transmitter, each location probability surface indicating a third plurality of probabilities that the wireless terminal is located, at the second time, in the corresponding plurality of geographic regions, the aggregation generating a composite location probability surface;

generating a second blended location probability surface based on the predicted location probability surface and the composite location probability surface; and estimating a second location of the wireless terminal at the second time based on the second blended location probability surface.

17. The method of claim 16, further comprising generating each of the plurality of location probability surfaces by:

generating an expected signal strength of the respective wireless transmitter in each of the plurality of regions, determining, for each region, a difference between the expected signal strength in the respective region and the signal strength of the respective wireless transmitter at the wireless terminal; and generating, for each region, a probability that the wireless terminal is located in the respective region based on the difference.

18. The method of claim 16, wherein the estimating of the second location of the wireless terminal at the second time is based on a second blended location probability surface, the method further comprising:

estimating a third location of the wireless terminal at a time earlier than the first time based on a third blended probability surface;

generating motion estimates and associated probabilities of the wireless terminal based on the third blended probability surface and the acceleration measurements, wherein the generation of the predicted location probability surface is further based on the generated motion estimates and associated probabilities.

19. The method of claim 16, further comprising determining, during each of a plurality of periodic time periods:

a motion surface, the motion surface defining a plurality of probabilities that the wireless terminal exhibited a plurality of corresponding motion parameters during the respective periodic time period, and a plurality of location surfaces, each location surface defining a plurality of probabilities that the wireless terminal is located, during the respective time period, in a corresponding plurality of regions, the plurality of location surfaces including:

a plurality of location probability surfaces, each location probability surface based on signals received at a different device, a composite location probability surface, the composite location probability surface aggregating corresponding probabilities of the plurality of location probability surfaces, a predicted location probability surface, wherein the predicted location probability surface defines the plurality of probabilities that the wireless terminal is located, in a next time period, in the corresponding regions, the predicted location probability surface based on the motion surface of the respective time period and a blended location probability surface of a previous time period, and the blended location probability surface, the blended location probability surface based on the predicted location probability surface and the composite location probability surface.

20. A non-transitory computer readable storage medium comprising instructions that when executed configure hardware processing circuitry to perform operations to estimate a location of a wireless terminal, the operations comprising:

receiving acceleration measurements representing motion of the wireless terminal at a first time;

estimating a location of the wireless terminal at the first time based on a first blended location probability surface, the first blended location probability surface indicating a plurality of probabilities that the wireless terminal is located, at the first time, in a corresponding plurality of geographic regions;

generating a predicted location probability surface of the wireless terminal based on the acceleration measurements and the first blended location probability surface, the predicted location probability surface indicating a second plurality of probabilities that the wireless terminal is located, at a second time subsequent to the first time, in the corresponding plurality of geographic regions;

aggregating a plurality of location probability surfaces, each location probability surface based on a signal strength at the wireless terminal of a different wireless transmitter, each location probability surface indicating a third plurality of probabilities that the wireless terminal is located, at the second time, in the corresponding plurality of geographic regions, the aggregation generating a composite location probability surface;

generating a second blended location probability surface based on the predicted location probability surface and the composite location probability surface; and estimating a second location of the wireless terminal at the second time based on the second blended location probability surface.

\* \* \* \* \*